(12) United States Patent
Crosta et al.

(10) Patent No.: US 11,551,570 B2
(45) Date of Patent: Jan. 10, 2023

(54) SYSTEMS AND METHODS FOR ASSESSING AND IMPROVING STUDENT COMPETENCIES

(71) Applicant: Smarthink Srl, Busto Arsizio (IT)

(72) Inventors: Lucilla Crosta, Busto Arsizio (IT); Riccardo Cattaneo, Lodi (IT); Giovanni Bettinazzi, Milan (IT); Andrea Solazzo, Varedo (IT); Luca Butera, Milan (IT)

(73) Assignee: Smarthink Srl, Busto Arsizio (IT)

( * ) Notice: Subject to any disclaimer, the term of this patent is extended or adjusted under 35 U.S.C. 154(b) by 1001 days.

(21) Appl. No.: 16/277,619

(22) Filed: Feb. 15, 2019

(65) Prior Publication Data

US 2019/0251477 A1     Aug. 15, 2019

Related U.S. Application Data

(60) Provisional application No. 62/630,959, filed on Feb. 15, 2018.

(51) Int. Cl.
   *G09B 7/02*     (2006.01)
   *G06N 20/20*   (2019.01)
   (Continued)

(52) U.S. Cl.
   CPC ............ *G09B 7/02* (2013.01); *G06N 20/20* (2019.01); *G06Q 10/06398* (2013.01);
   (Continued)

(58) Field of Classification Search
   CPC . G09B 7/02; G09B 5/065; G09B 5/12; G09B 5/14; G09B 7/04; G06N 20/20; G06Q 10/06398; G06Q 50/205
   See application file for complete search history.

(56) References Cited

U.S. PATENT DOCUMENTS

| 7,401,295 B2 | 7/2008 | Aldrich et al. |
| 8,472,860 B2 | 6/2013 | Johnson et al. |

(Continued)

FOREIGN PATENT DOCUMENTS

IN   201841042607 A   11/2018

OTHER PUBLICATIONS

International Search Report and Written Opinion for Application No. PCT/IB2019/000187, dated Jun. 14, 2019 (14 pages).

(Continued)

*Primary Examiner* — Justin S Lee
(74) *Attorney, Agent, or Firm* — Nutter McClennen & Fish LLP

(57) ABSTRACT

A skills learning method for a student gathers objective data relating to the student in response to various stimuli, and produces a predicted feedback units as a function of the objective data using a machine learning-base classifier. The method can include training a neural network using objective data of student interactions and associated subjective assessments of a skill of each objective data. The method includes receiving a new dataset with objective data of a new student and an associated subjective assessment of a skill of the first student represented by the new objective data. A predicted assessment of the skill of the new objective data is calculated by inputting the new objective data into the neural network. The method can include updating the neural network by combining the initial dataset and the new dataset and recompiling the neural network to fit the model dataset based on a learning algorithm.

31 Claims, 13 Drawing Sheets

(51) Int. Cl.
G09B 7/04 (2006.01)
G09B 5/14 (2006.01)
G06Q 50/20 (2012.01)
G09B 5/12 (2006.01)
G09B 5/06 (2006.01)
G06Q 10/06 (2012.01)

(52) U.S. Cl.
CPC ........... *G06Q 50/205* (2013.01); *G09B 5/065* (2013.01); *G09B 5/12* (2013.01); *G09B 5/14* (2013.01); *G09B 7/04* (2013.01)

(56) References Cited

U.S. PATENT DOCUMENTS

| | | | | |
|---|---|---|---|---|
| 9,619,465 | B2* | 4/2017 | Och | G06F 40/47 |
| 10,311,742 | B2* | 6/2019 | Falash | G09B 5/06 |
| 10,552,764 | B1* | 2/2020 | Carlin | G06N 7/005 |
| 2003/0200136 | A1 | 10/2003 | Dewar | |
| 2009/0075246 | A1 | 3/2009 | Stevens | |
| 2015/0242797 | A1* | 8/2015 | Hoanca | G06Q 10/06398 705/7.42 |
| 2017/0076622 | A1 | 3/2017 | Roberston et al. | |
| 2017/0103671 | A1 | 4/2017 | Gobert et al. | |
| 2017/0220943 | A1* | 8/2017 | Duncan | G06N 5/04 |
| 2018/0165779 | A1* | 6/2018 | Martin | G06Q 10/06 |
| 2018/0240015 | A1* | 8/2018 | Martin | G09B 7/00 |
| 2018/0247549 | A1* | 8/2018 | Martin | G09B 19/00 |
| 2018/0253989 | A1 | 9/2018 | Gerace | |
| 2018/0286272 | A1* | 10/2018 | McDermott | A61B 5/375 |
| 2018/0295419 | A1* | 10/2018 | Thielen | G09B 19/0038 |
| 2020/0258412 | A1 | 8/2020 | Liedtke | G09B 7/00 |

OTHER PUBLICATIONS

Sao Pedro et al., "Leveraging machine-learned detectors of systematic inquiry behavior to estimate and predict transfer of inquiry skill," User Modeling and User-Adapted Interaction, Sep. 17, 2011, vol. 23, pp. 1-39.

* cited by examiner

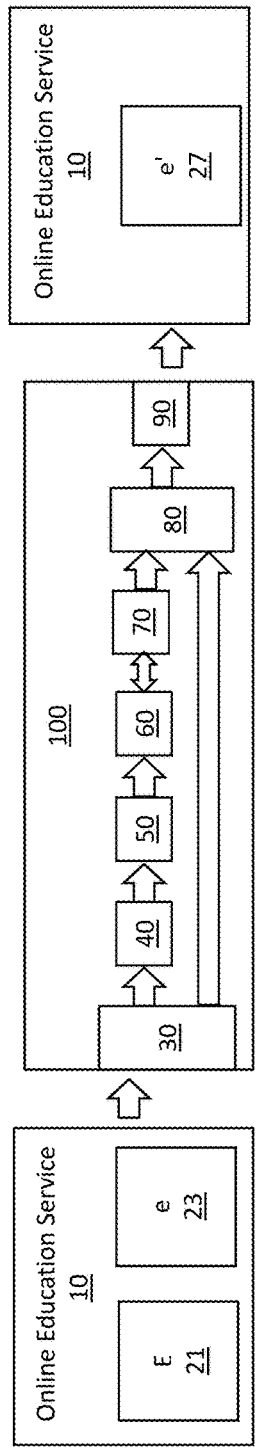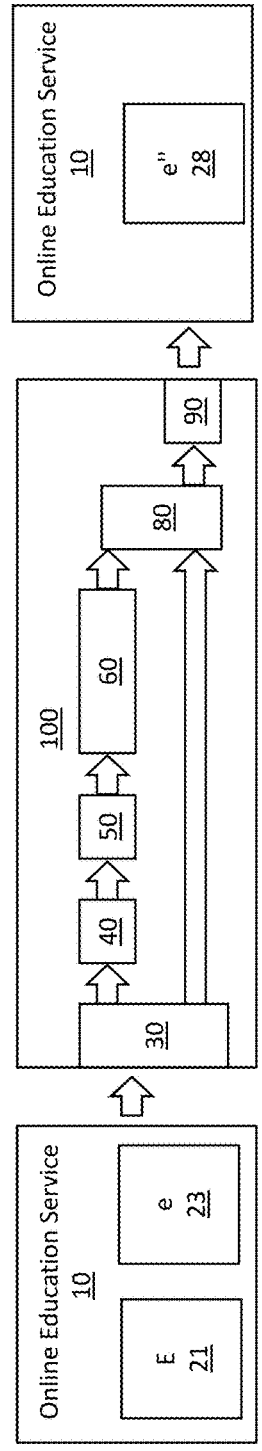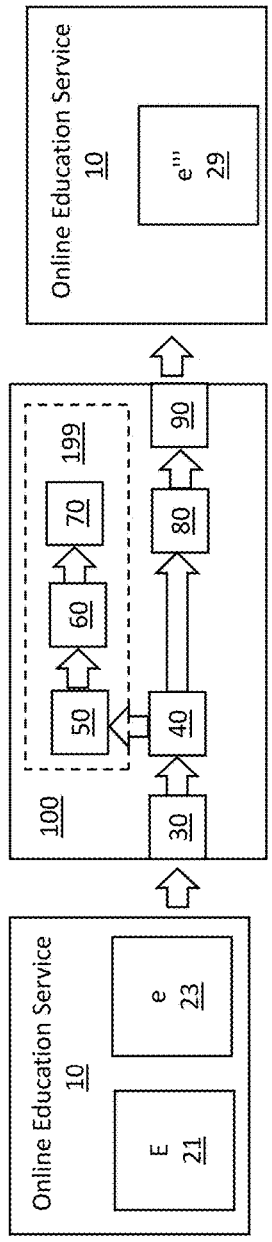

SYSTEMS AND METHODS FOR ASSESSING AND IMPROVING STUDENT COMPETENCIES

CROSS-REFERENCE TO RELATED APPLICATION(S)

This patent application claims the benefit of U.S. Provisional Patent Application No. 62/630,959 entitled Objective Monitoring and Measuring Tool for Assessing and Improving Student Competencies, filed Feb. 15, 2018, which is hereby incorporated herein by reference in its entirety.

FIELD

Illustrative embodiments generally relate to addressing student competencies and, more particularly, to evaluating student competencies and recommending ways to improve those competencies.

BACKGROUND

International Universities and Higher Education Institutions have been recently challenged for not being able to help students to properly develop those skills and competencies required by the marketplace. Universities have been challenged for providing credits to students only on the basis of hours of lessons attended rather than on the basis of skills developed, undesirably producing graduates not ready for the market place.

Universities are indeed developing online programs accessible by anyone, from anywhere and anytime in the world. These programs could deliver credits to students on the basis on the competencies they improved upon rather than on the basis of the hours of training they attended. These institutions can grant access to the market place to the students who will be able to better prove and to show to their future employers, that they have gained the desired skills. A critical problem here is that there are no currently, intelligent systems that can monitor and measure the level of specific skills/competencies developed (per each online student) that can suggest at the same time targeted resources and activities to each learner for improvement. Moreover, it is difficult, in this new system, to state how a student has developed some specific skills or competencies. Indeed, it usually is the teacher or the tutor who solely detects, measures and makes a judgment over the knowledge gained by a student and on the achieved learning goals. In addition, current educational technology tools known by the inventors available in the market measure students' drop out risk, or students' degree of achievement of learning goals, or amount of knowledge acquired, but not yet competencies.

SUMMARY

Certain aspects of the present disclosure include a computer-implemented system for assessing student skills using machine learning. The system includes an input, a dataset processor, a compiler, and a calculator. The input is configured to receive an initial dataset including a plurality of objective data of student interactions of a same type, and for each of the plurality of objective data, at least one subjective assessment of a skill of a student represented in the respective objective data of that student, and a new dataset including objective data of a first student of an interaction of the same type as the initial dataset, and an associated subjective assessment of the skill represented by the new objective data. The dataset processor is configured to remove extra segments from the initial dataset and the new dataset, the extra segments being a subset of the objective data not associated with the subjective assessment of the skill. The added is configured to combine the processed initial dataset and the processed new dataset to form a model dataset. The compiler is configured to compile a neural network model to fit the processed initial dataset, the neural network model receiving processed objective data as an input and calculating a predicted assessment of the skill of the objective data as an output, and recompile the neural network model using the model dataset with a learning algorithm to fit the model dataset. And the calculator is configured to generate a predicted assessment of the skill of the objective data of the first student by inputting the processed new objective data of the first student into the neural network before or after the neural network has been recompiled.

Another example is a method of assessing student skills using machine learning. The method includes receiving, with a computer system, an initial dataset including a plurality of objective data of student interactions of a same type, and for each of the plurality of objective data, at least one subjective assessment of a skill of a student represented in the respective objective data of that student. The method further includes processing, with a computer system, the initial dataset to remove extra segments, the extra segments being a subset of the objective data not associated with the at least one subjective assessment of the skill, compiling, with a computer system, an neural network model to fit the processed initial dataset, the neural network model receiving processed objective data as an input and calculating a predicted assessment of the skill of the objective data as an output, receiving, with a computer system, a new dataset including objective data of a student interaction of a first student of the same type as the initial dataset and an associated subjective assessment of the skill of the first student represented by the new objective data, processing, with a computer system, the new dataset to remove extra segments, combining, with a computer system, the processed initial dataset and the processed new dataset to form a model dataset, recompiling, with a computer system, the neural network model to fit the model dataset based on a learning algorithm, and calculating, with a computer system, a predicted assessment of the skill of the objective data of the first student by inputting the processed objective data of the first student into the neural network before or after being recompiled to fit the model dataset.

In some instances, the initial dataset includes, for one or more of the plurality of objective data, subjective assessments of two or more skills of the student represented in the respective objective data of that student, and wherein the neural network model is compiled to fit one skill of the two or more skills of the initial dataset, the one skill being the same as the received associated subjective assessment of the first dataset. In some instances, the new dataset includes an associated subjective assessment of two or more skills of the first student, the two or more skills of the new dataset being also in the two or more skills of the initial dataset, the method including compiling a neural network model to fit each of the two or more skills of the processed initial dataset and calculating a predicted assessment of the two or more skills of the objective data of the first student by inputting the processed objective data of the first student into the respective neural network.

In some instances, receiving the new dataset includes receiving the new dataset via an online learning service. In some instances, the method includes providing the predicted assessment to the online learning service.

In some instances, the method includes compiling the neural network model to fit the processed initial dataset includes compiling a plurality of candidate models each based on different learning algorithms, and the method includes measuring a quality of each the plurality candidate models with respect to at least one of: the initial dataset and a validation dataset, and implementing one of the plurality of candidate models as the neural network model based on the measured quality. In some instances, measuring the quality of each of the plurality of candidate models includes calculating a receiver operating character curve. In some instances, the quality is an objective measure of how well each of the plurality of candidate models recreates subjective assessments of a dataset when objective data of the dataset is provided as an input to each of the plurality of candidate models.

In some instances, the learning algorithm is a plurality of learning algorithms and recompiling neural network model to fit the model data comprises compiling a plurality of candidate models each based on different learning algorithms, the method includes measuring a quality of each the plurality candidate models with respect to at least one of: the initial dataset, the model dataset, and a validation dataset, and implementing one of the plurality of candidate models as the recompiled neural network model based on the measured quality. In some instances, measuring the quality of each of the plurality of candidate models includes calculating a receiver operating character curve. In some instances, the quality is an objective measure of how well each of the plurality of candidate models recreates subjective assessments of a dataset when objective data of the dataset is provided as an input to each of the plurality of candidate models.

In some instances, each of the objective data of the initial dataset includes text written by a respective student, wherein the objective data of the new dataset includes text written by the first student, and wherein processing the initial dataset and the new dataset to remove extra segments from the respective objective data includes converting the text of the objective data into a Bag of Words structure. In some instances, converting the text into a Bag of Words structure includes one or more of: expanding contractions in the text, converting the text of the objective data into tokens, removing punctuation from the text, removing numbers from the text, and reducing each word of the text to a root word.

In some instances, the at least one subjective assessment of the initial dataset includes a respective student self-assessment and teacher assessment, and wherein the output of the neural network model includes a predicted self-assessment of the skill and a predicted teacher assessment of the skill for each objective data input. In some instances, the associated subject assessment includes a student self-assessment.

In some instances, the method includes soliciting a self-assessment from the student associated with the new dataset, and providing the predicted assessment of the skill of the objective data of the first student upon receiving the self-assessment.

In some instances, the skill is one of the following: critical thinking, problem solving, multiculturalism, communication, plain English, collaboration, leadership, collaboration, and organization.

In some instances, the student interaction is a written response to the writing prompt, and the objective data the text of the written response. In some instances, the student interaction is group project, and the objective data includes tracked activity of student members completing the group project. In some instances, the student interaction is a group video conference, and the objective data includes facial expressions of the student members participating in the group video conference.

In some instances, the student interaction is an internet forum, and the objective data includes written posts to the internet forum. In some instances, the associated subjective assessment and the predicted assessment are selected from a set of integers of 100 or fewer. In some instances, the associated subjective assessment and the predicted assessment are selected from the set of integers 1 to 5. In some instances, the associated subjective assessment and the predicted assessment include a thematic assessment.

Another example is a method of assessing student skills using machine learning, the method including receiving, with a computer system, a first dataset including objective data of a student interaction of a first student and an associated subjective assessment of a skill of the first student represented by the objective data of the first dataset, processing, with a computer system, the first dataset to remove extra segments, the extra segments being a subset of the objective data not associated with the subjective assessment of the skill, receiving, with a computer system, a second dataset including objective data of a second student of a same type of student interaction and an associated subjective assessment of the skill of the second student represented by the objective data of the second student, processing, with a computer system, the second dataset to remove extra segments, combining, with a computer system, the processed first and second datasets to form a model dataset, compiling, with a computer system, a neural network model to fit the model dataset based on a learning algorithm, the neural network model receiving processed objective data as an input and calculating a predicted assessment of the skill of the processed objective data as an output, calculating, with a computer system, an predicted assessment of the skill of the objective data of at least one of the first student and the second student by inputting the processed objective data of the respective student into the neural network.

In some instances, receiving the first and second datasets includes receiving the first and second datasets via an online learning service. In some instances, the method includes providing the predicted assessment to the online learning service.

In some instances, the method includes calculating, with a computer system, an assessment of the skill of the objective data of the second student by inputting the processed second objective data of the second student into the neural network.

In some instances, the method includes compiling the neural network model to fit the model dataset includes compiling a plurality of candidate models each based on different learning algorithms, and the compiling includes measuring a quality of each the plurality candidate models with respect to at least one of: the model dataset and a validation dataset, and implementing one of the plurality of candidate models as the neural network model based on the measured quality.

In some instances, measuring the quality of each of the plurality of candidate models includes calculating a receiver operating character curve. In some instances, the quality is an objective measure of how well each of the plurality of candidate models recreates subjective assessments of a dataset when objective data of the dataset is provided as an input to each of the plurality of candidate models.

Yet another example is a computer program product for use on a computer system for assessing student skills using machine learning the computer program product including a tangible, non-transient computer usable medium having computer readable program code thereon. The computer readable program code includes program code configured to receive an initial dataset including a plurality of objective data of a type of student interaction and, for each of the plurality of objective data, at least one subjective assessment of a skill of a student represented in the respective objective data of that student, process the initial dataset to remove extra segments, the extra segments being a subset of the objective data not associated with the subjective assessment of the skill, compile a neural network model using the processed initial dataset, the neural network model receiving processed data as an input and calculating an assessment of the skill of the processed data as an output, receive a new dataset including objective data of a first student in response to stimuli of the same type as the initial dataset and an associated subjective assessment of the skill in new objective data, process the new dataset to remove extra segments, combine the processed initial dataset and the processed new dataset to form a model dataset, recompile the neural network model using the model dataset based on a learning algorithm, and calculate an assessment of the skill of the objective data of the first student by inputting the processed objective data of the first student into the neural network before or after being recompiled to fit the model dataset.

Other aspects, features, and advantages of the subject matter included herein will be apparent from the description and drawings, and from the claims.

BRIEF DESCRIPTION OF THE DRAWINGS

Those skilled in the art should more fully appreciate advantages of various embodiments of the invention from the following "Detailed Description," discussed with reference to the drawings summarized immediately below.

FIGS. 11A-C are schematic illustrations showing the overall operation of the assessor system in different operative modes.

DETAILED DESCRIPTION

Figure 1:
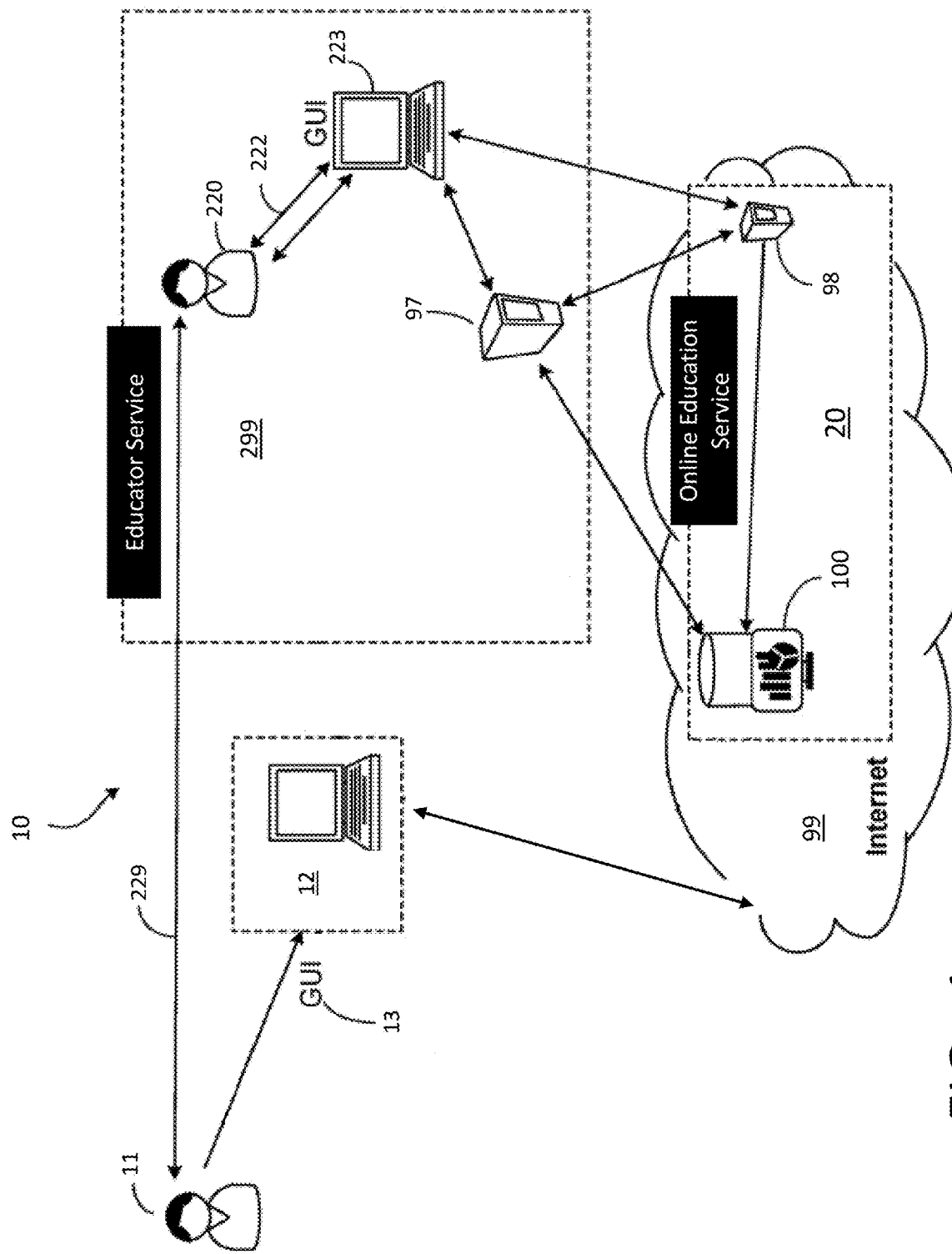
FIG. 1 is a schematic illustration showing an example of an online education service for distributing and receiving digital education information in accordance with illustrative embodiments of the present disclosure.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure.

With the most recent diffusion of digital badges, digital and alternative credentials and with a Competency Based Education System (CBES) growing in US but also internationally, measuring and monitoring students' skills and competencies is becoming more and more key. Illustrative embodiments of the present disclosure address this issue with a specific product (referred to herein as an "Edulai product") to create an intelligent EdTech tool that can detect inside an online course, according with the activities undertaken by the students, the level of development of their skills, while helping them to improve the skills in which they are weak.

It should be noted that the terms "competencies" and "skills" may be used interchangeably herein, even if one can consider the former as a more comprehensive term including also the term skill. Indeed, while skill defines a specific individual capability, such as critical thinking, problem solving and so on, competency also refers to how a student have mastered a specific skill or capability.

Illustrative embodiments of the invention are implemented as a computer program product having a computer usable medium with computer readable program code thereon. The computer readable code may be read and utilized by a computer system in accordance with conventional processes.

Illustrative embodiments relate to an educational technology tool (e.g., a standalone tool or other tool) that can integrate with a variety of different virtual learning environments or Learning Management Systems (LMS), such as Moodle or Blackboard for example. To that end, illustrative embodiments are aimed at monitoring and measuring the level of competencies and skills development achieved individually by each student online. As noted above, this tool may be referred to as "Edulai" or an online education service. Among other things, some of the measured and assessed skills might include, for example, critical thinking, team work, communication, collaboration, leadership, organizational skills, problem solving, creation of new knowledge and so on. The tool/platform also may suggest to each student different targeted content for competence/skills improvement. Preferably, that content refers mainly to high quality OER (Open Educational Resources), MOOCS materials and/or journal articles/conference papers already accessible by the institution and to any other high quality resource free (or not free) or not available on the Internet. Indeed, the tool may suggest other resources—the noted resources are illustrative only.

In illustrative embodiments, one aim of the tool is to be able to assess online students' competences/skills in different moments in time, while providing both formative (interim) and a summative (final) assessments to each student. The assessment process preferably is undertaken using an Intelligent System based on the use of Artificial Intelligence (AI). Both the students and the teacher can have access to these measurements and see the type of additional content suggested by the system.

As known in the art, the artificial intelligence can be defined as a software system that learns and replicates how humans think and act. In this case, in its AI features, Edulai may make use of both Semantic Web techniques, and a Recommendation System of Machine and Deep Learning system.

Since aspects of the present online education service are based initially on detecting competencies and skills in online courses (but not only such courses in some embodiments), it uses materials produced online by students, such as: students online discussion forum posts/messages (in any of their audio, visual, written or combined format); group or learning team material produced, students' e-portfolio, project management information, students' assignments, emails exchanged, online audio and video conferences material (detecting facial expression for example), any type of learning analytics available and accessible in the system, for detecting students' competencies and skills. aspects of the present online education service can also use material produced by a teacher or other person, such as feedback in any of video, audio, written, or combined format, posts/messages in any of their forms to students and to group discussion, email exchanged, etc.

Assessment Framework

In an effort to attain long-term goals, illustrative embodiments innovate online education so that the student is involved in his/her assessment process at the beginning, during, and end of the learning journey. To that end, aspects of the present online education service can use the idea of "formative, summative, and sustainable assessments." Indeed, in developing various embodiments, the inventors recognized that technology per se cannot really make a difference if not based on a strong pedagogical framework that supports it. Accordingly, aspects of the present online education service can provide students at one or more of the beginning, during, and end of a module or course with an assessment of the competences/skills developed. Various embodiments thus follow and support students at different moments during their learning journey to help them detect their weakness and to improve upon them.

To provide effective and reliable online competencies/skills assessment process, illustrative embodiments use an "Edulai Triangulated Assessment Framework" ("TAF"). Specifically, online students' competency development is detected through a combination of the following three types of assessments:

A faculty online assessment;
A student online self-assessment; and
The Intelligent System online assessment using artificial intelligence (AI).

At different moments in time during the students' learning journey, student competencies are assessed using the TAF system to allow comparison between former assessments and future assessment, formative assessment and summative assessment, and the identifications of students' learning needs.

While faculty assessment also may be completed on the basis of the quality of the work produced and submitted to them by the students, students' self-assessment preferably is obtained through a self-evaluation process on given skills the student assesses at given moments. The combination of the faculty and student assessment, as well as the assessment by the online intelligent system constitutes the complete evaluation on the students skills/competencies at specific moments. An example of student skill assessment form is provided below using "critical thinking" skill simply as example. A form also may be used for assessing other skills.

TABLE 1

Skill assessment form
CRITICAL THINKING SKILL
Assessment form

Analytic Assessment

| | |
|---|---|
| Reasonable reference to resources: | from 1 to 5 |
| Independent thinking | from 1 to 5 |
| Alternative thinking or different approaches showed | from 1 to 5 |
| Engagement in the discussion | from 1 to 5 |
| Logical thinking | from 1 to 5 |
| Construction of the discourse | from 1 to 5 |
| Quality of the Writing | from 1 to 5 |

Measurement of the skill will go from 1 to 5. However, it could also go from 1 to 7 according with the different cases identified with the use of the Intelligent System.

Thematic Assessment competitive/collaborative
gentle/arrogant
clear/confused
different cultures respectful/different cultures not respectful
gender respectful/gender not respectful
discussion with the same peers/discussion with different peers.

Per-skill, the above form has a subset of skills that each request assessment on a 5 point scale from Poor to Excellent (1 to 5) (Poor—Fair—Good—Very Good—Excellent) using a star system. This assessment preferably is undertaken by one or more of 1) the student as a self-assessment, 2) the teacher, and 3) the intelligent system. In addition, the intelligent system also may undertake the Thematic Assessment as illustrated above, choosing one of the two proposed terms in each row.

The intelligent system online assessment skill is the result of a combination of procedures based on analysis of a wide variety of learning analytics available and accessible in the system. For example, among other things, those analytics may include, the student's online behavior, the student's online discussion forum posts/messages (in any of their audio, visual, written or combined format), group or learning team material produced, student's e-portfolio, project management information, student assignments, emails exchanged, and/or online audio and video conferences material (looking at student's facial or verbal expressions for example).

The combination of the three types of assessments made at different moments in time can provide an assessment of the students' skills. In some instances, a user interface for interacting with an online education service provides for input of a teacher's assessment and a student assessment of a particular student interaction tracked (or otherwise submitted to) the online education service, such as an essay or group project. The user interface can provide space for adding "some free comments and text" in case the assessor would like to provide more qualitative feedback to the student in addition to the more quantitative/objective ones. The same is possible for the student, who can explain the reasons why he/she provided him/herself that assessment. Hence, the student may use the same type of form for performing his/her own skill self-assessment.

In an illustrative embodiment of a student's dashboard, when accessing access the online education service, a student is presented with a screen and a set of skills with indicators of the level of skill development for a given skill. Moreover, clicking on each skill can provide different information on the assessment, such as the development of a specific skill over a period of time according with the different type of assessments submitted, and so on. On the other side, the teacher's view of his/her overall student situation, in terms of skill development, may be represented with a list of his/her students per each skill and with the degree of development reached for it visualized with the number of stars. The teacher can also unpack the skill assessment to see how each actor has assessed the student for that skill.

Examples of AI Implementation in Edulai

Aspects of the present online education service can be integrated with API international standards in different learning management systems (LMS) and with different tools integrated into those systems. Indeed, inside an LMS, such as Moodle, some embodiments display an Edulai logo and/or related visual indicia to be clicked and accessed.

Figure 3:
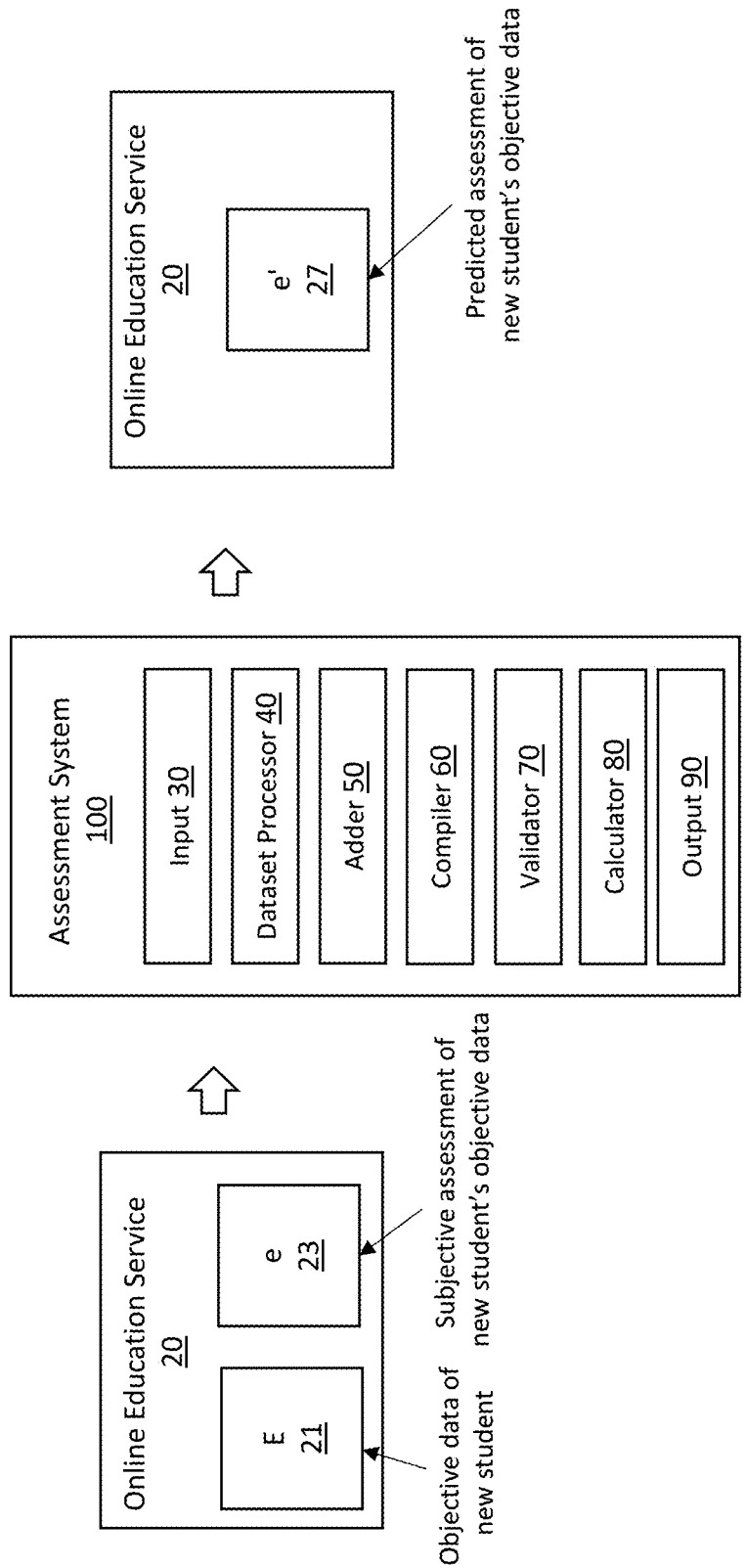
FIG. 3 is schematic illustration showing assessor system interfacing with an online education service.

In illustrative embodiments, an aspect of the present online education service collects data from students' works, posts and behaviors, and stores them in the system (i.e., learning analytics) as explained above. For example, a given API standard version may ask the online education service both to have access to a Turnitin system (a plagiarism detection software very often used by Higher Education institution) or similar software of the same kind, (e.g., where students submit their assignments online) and to implement Edulai discussion forum functionalities, to add to those of the LMS, where the Artificial Intelligent tool analyzes students' contributions and posts. An example of one such forum may include online communities such as reddit. Indeed, illustrative embodiments preferably use a simple discussion area where discussion threads and sub-threads are visualized according with how the conversation develops around a specific topic. Moreover, posting text, audio, video messages should be simple and straightforward as shown by FIG. 3.

The AI system can perform both a Sentiment Analysis and a Semantic Web Analysis in order to understand if specific patterns can be found in the works submitted online by students. The AI system determines if these could be linked to the different degree of development of a specific skill. A student's online behavior also may be taken into consideration while performing this analysis. Hence, the AI tool identifies different patterns corresponding to one or more specific skill(s) and to different degree(s) of development of those specific skill(s). For example, to detect the development of critical thinking skill connectors such as: in one view, on the other side, on the opposite, however, different perspective etc. are sought and according with the place where they are placed, the frequency with which they will be used and the individual to whom they will be directed, the system shows different degree of critical thinking for that student (from Poor—the lowest—to excellent—the highest). The AI system includes also the Thematic Assessment, explained above, and the Learning Analytics Analysis in its assessment Another example on how some students' skill(s) may be detected by AI is with the use of a Project Management software embedded into aspects of the present online education service for detecting skills more related to "team work", "leadership", "collaboration", "organization" and so on. Such software may be used by a student for planning their team work as showed in FIG. 4, in addition to a discussion they will undertake for accomplishing these team tasks. In this way, the student may insert information, such as 1) who is in charge of what task, 2) the deadline, and 3) if the deadline is met or not met, etc. The system uses this additional information to be translated in additional learning analytics for making a judgment on those specific skills.

Hence, as noted above, the AI system assessment, combined with the teacher's assessment and the student's self-assessment on a specific skill, provides the final overall assessment for a student on a specific skill.

In illustrative embodiments, the AI system analyzes different patterns belonging to similar or different skills in order to identify their level of development. Some patterns may be unique for one skill, or they may extend across and/or be common to several different skills. The AI can perform different assessment(s) at different moments in time according to the need of the customer, and a final assessment (summative assessment) of the skills will consider the previously completed assessments (formative assessment).

After the final overall three way assessment (TAF) has been processed by the online education service, its results are visible both to the student and the teacher. Aspects of the present online education service then may begin suggesting targeted resources to each student for improving each specific skill according with the degree of development of that specific skill. This is known as "personalized learning." Accordingly, the suggestion received by student "X" may be different from the suggestion received by student "Z". Resources suggested can vary, such as free high quality resources available on the Internet, such as OER (e.g., Ted Talk, Linkedin, Merlot, etc.), selected fee paying sites or resources accessed by customers themselves and/or already available to them because subscriptions (e.g., journal, conference papers, etc.), or resources that can be accessible online on a fee basis from other content providers, such as publishers, MOOCs, and so on.

The resources preferably are used by the student before developing future assignments and posts and subsequent Edulai formative assessment(s) detect and analyze the same skills again on the new student's submitted works.

Resource Suggestion Interface

Figure 5:
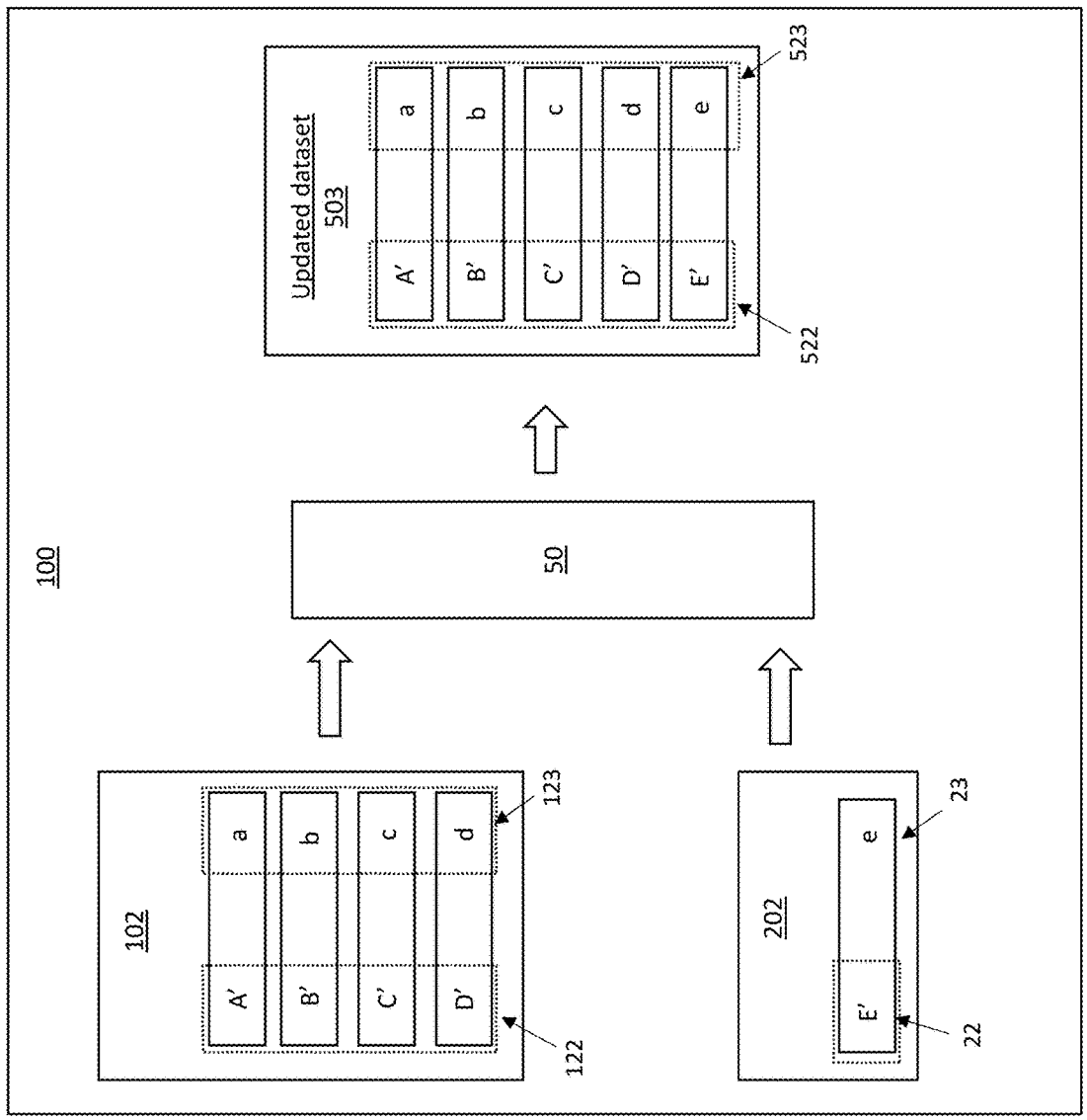
FIG. 5 is a schematic illustration showing a dataset adder operation of the assessor system.

Certain aspects of the present online education service provide a resource suggestion system via a recommendation system software that recommends resources to the student that are connected to a specific skill he/she needs to develop. For example, if the AI system detects that the assessment of a student skill is poor or fair, then the online education service may suggest some specific resources attached to that skill and the requirements for significant improvement. In contrast, if the AI system detects that the assessment of a student skill is good or excellent, it may suggest some other type of resources for that skill and perhaps a more advanced way to refine the skill. FIG. 5 shows one embodiment of how this Resource Recommendation System interface may appear to both the student and the teacher per each skill. The system can also suggests additional resources as "you may be interested in" according with the resources that other students with similar degrees of skill development, have found useful, etc.

It is possible for both the student and the teacher to place written comments on each resource, to place "like" indicia or "dislike" indicia to it, to suggest the resource to a specific student, and/or to a specific peer while sharing it with him/her and so on. The AI system may record all these actions around the resources and refine, over time, the type of resource it suggests to a specific student for a specific skill.

Moreover, students can also create their own area of resource storage while selecting those resources more useful to them time after time.

Machine Learning Assessor Systems

FIG. 1 is a schematic illustration showing an example of an LMS implemented as an education system 10 for distributing and receiving digital education information in accordance with illustrative embodiments of the present disclosure. The education system 10 can include, among other things, an online education service 20 for monitoring and processing online student interactions and an assessor system 100 for providing an AI assessment one or more soft skills characterized in the interactions.

FIG. 1 shows that the education system 10 includes a traditional educator service 299, which can be, for example, a teacher 220 for assessing student work. The education system 10 also includes the online education service 20 which can be accessed on the internet 99 by a student 11 interacting with a computer device 12, such as a laptop or smart phone, via, for example, a graphic user interface 13. In some instances, the online education service 20 is a cloud-based service that is run on a server 98 that is remote to the teacher 220 or educator service 299. In other instances, the online education service 20 is run, for example, by a university on a server 97 local to the educator service 299. In either instances, the assessor system 100 can also be cloud-based on locally run by the educator service 299, and, in either case, the student 11 is able to interact with the online education service 20 via the internet 99. In some instances, the teacher 220 can directly interact 229 with the student 11 outside of the online education service 20 to, for example, receive a physical copy of an interaction (e.g., an essay) to put into the online education service 20 or to provide feedback (e.g., a subject assessment and/or a prediction of the subjective assessment from the assessor system 100) directly to the student.

In operation, the online education service 20 receives or otherwise tracks interactions of the student 11 and the teacher 220 is able to provide a subjective assessment of those interactions via their own access 222 to the online education service 20, such as a personal computer 223. The teacher 220 is able to view the student interactions received by the online education service 20 and provide their subject assessment. The assessor system 100, or the online education service 20 generally, extracts metrics from the student's interactions and the assessor system 100 uses machine learning to compile a classifier based on the metrics and the associated subject assessments of the student's interaction, such that the resultant classifier can receive metrics of one or more particular student interactions and provide a predictive assessment of the interactions as an output to the online education service 20. In some instances, the subject assessments also include student self-assessments.

Figure 2A:
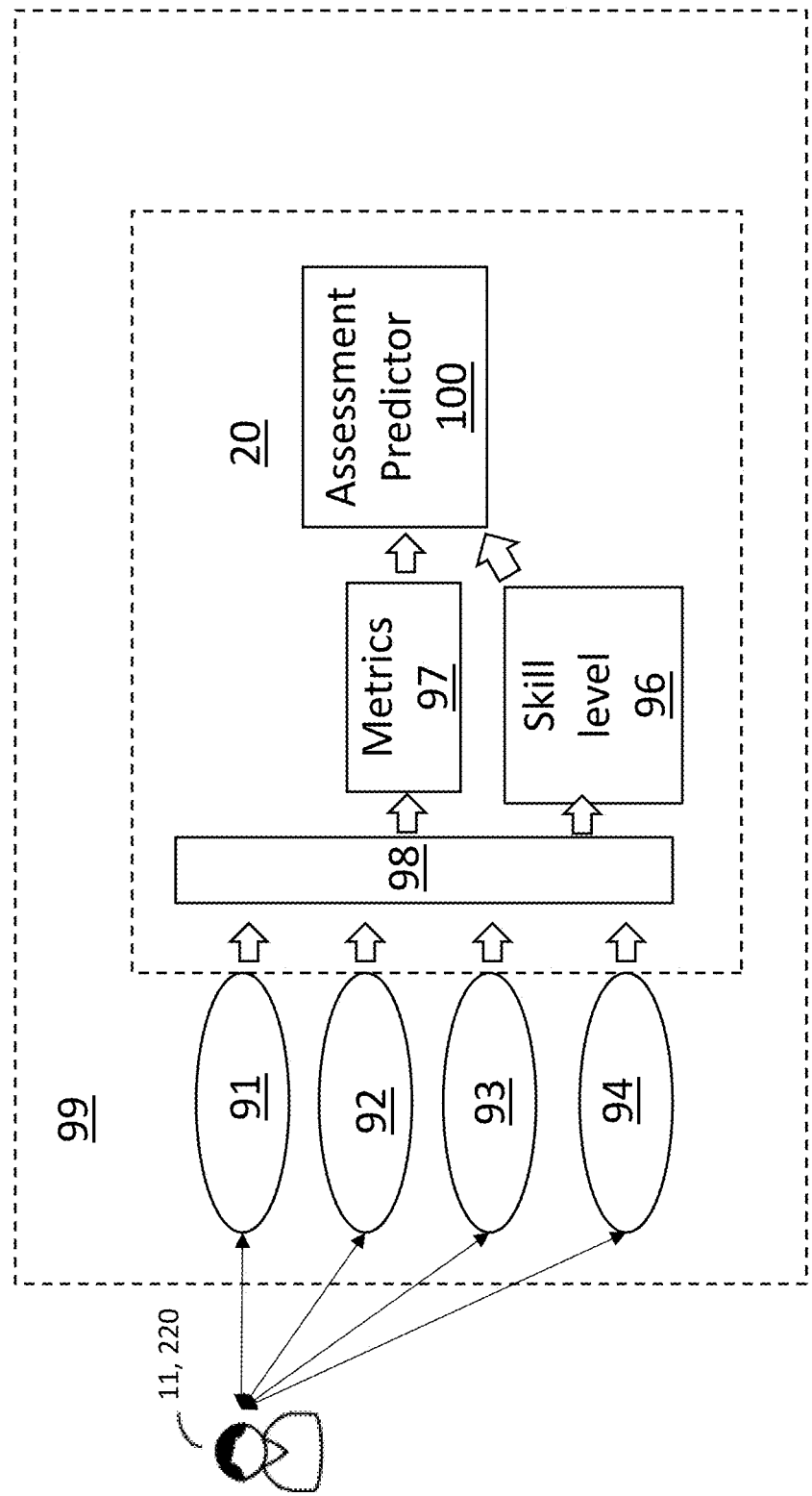
FIG. 2A is a schematic illustration showing an assessor system receiving input from a number of different sources of student interaction.

FIG. 2A is a schematic illustration showing an assessor system 100 receiving input from a number of different sources of student interactions. FIG. 2A shows a student or teacher conducting various digital activities on the internet 99. Example activities includes posting on a forum 91, submitting a written assignment 92, conducting a group video call 93, or participating in a group project 94. In all instances, a service 98 of the online education service 20 receives objective data regarding the student activity as well one or both of the teacher's subject assessment of the interaction and the student's self-assessment of the interaction. In either assessments, the teacher or student is providing a subject assessment 96 of one or more soft skills represented in the interaction. The online education service 20 processes the student's interaction to extract metrics 97 associated with the skill(s) being assessed, and inputs both the metrics 97 and the subjective assessment 96 into the assessor system 100, which then calculates a predicted assessment of the student interaction using on a classifier model, such as a neutral network, that has been trained using a database of previous student interactions and associated subjective assessments.

Figure 2B:
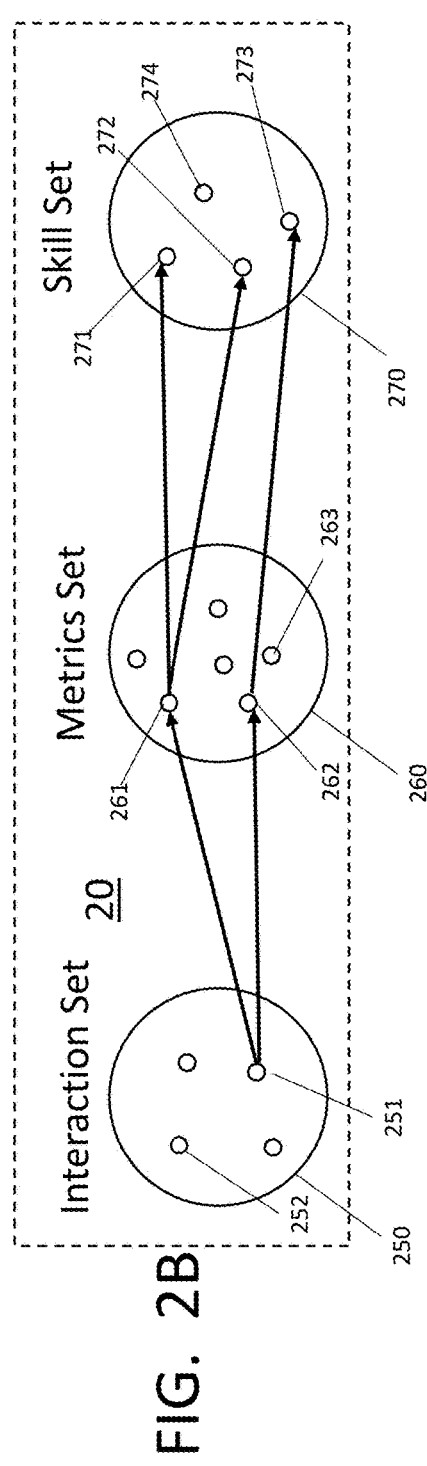
FIG. 2B is a schematic illustration showing the relationship between predefined interactions, metrics, and associated skills.

FIG. 2B is a schematic illustration showing the relationship between predefined interactions, metrics, and associated skills. In order to know what metrics to extract can be extracted from various student interaction types, a predefined database can be used to associated different interactions with different metrics, as well as associating different metrics with the one or more soft skills that can be predicted with a classifier based on the metric. The online education service 20, or the assessor system 100 itself, can have a predefined set of interactions 250, metrics, 260, and skills 270. The interaction set 250 includes types of student interactions 251, 251 for which different metrics 260 can be computed for that specific interaction. For example, a first interaction type 251 has two different associated metrics 261, 261 of the metric set 260 that can be extracted or computed from the first interaction type 251. The metric set 26 can contain additional metrics 263 associated with different interactions 252. Additionally, for each metric 261, 262, there are one or more associated skills 271, 272, 273 for which a prediction can be made based on those metrics 261, 262. Accordingly, in some instances, there is only a subset of metrics that are used to predict a grade for a skill, and only a subject of interactions of a use can be used to obtain a specific subset of metrics.

Figure 2C:
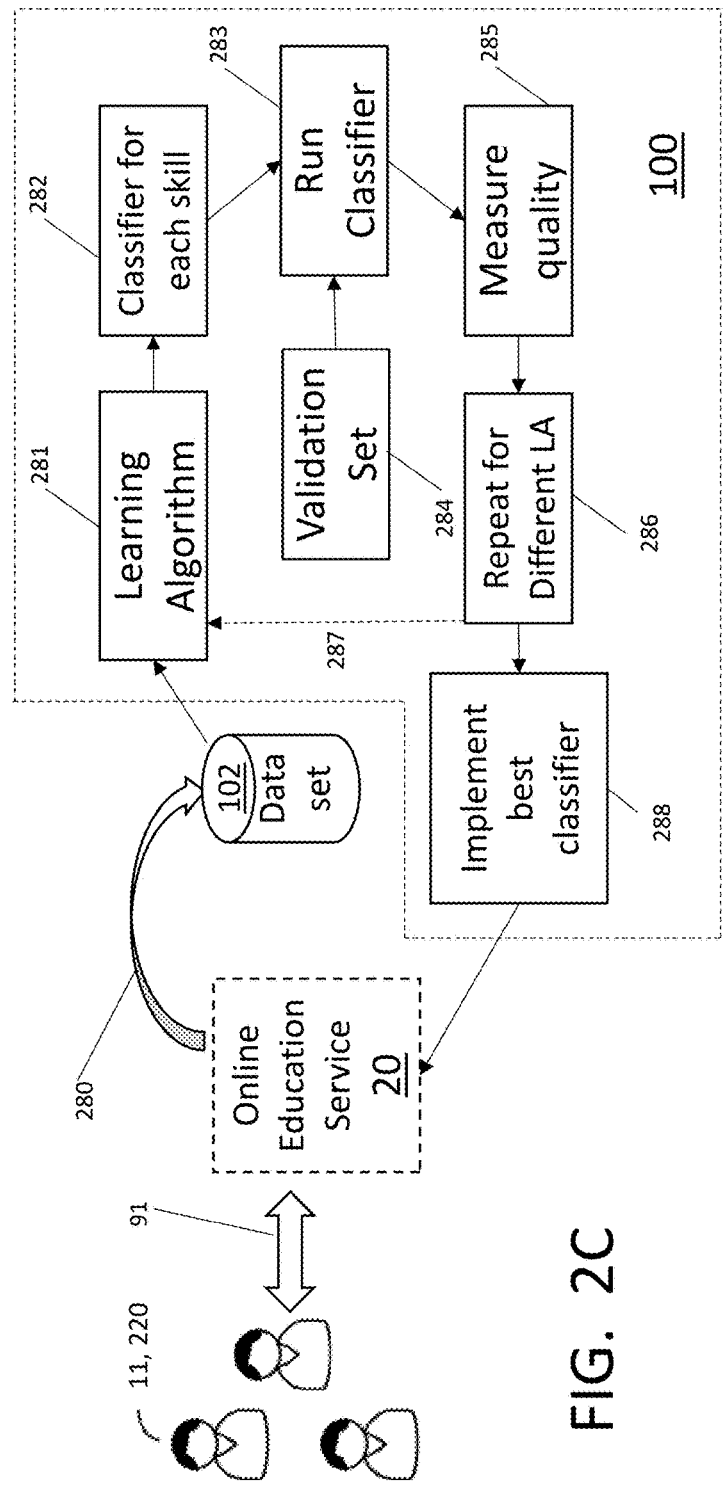
FIG. 2C is a schematic illustration showing the iterative training operation of an assessor system.

FIG. 2C is a schematic illustration showing the iterative training operation of an assessor system 100. Teachers 220 and students 11 interact 91 with the online education service 20, and the online education service 20 adds 280 the metrics of the student's interactions and the teacher's subjective assessments of those interactions to a dataset 102. The assessor system 100 uses a learning algorithm 281 to compile a classifier model 282 for each skill. The classifier receives student interactions as an input and outputs a predicted assessment of a skill displayed by the student's interaction. However, the classifiers are dependent on the dataset 102 and the learning algorithm 281, so they can be improved as more data or different learning algorithms become available. For example, validation set 284 can be used to validate 283 a classifier. The validation set 284 can be a set of student interactions and subjective assessments there were not used in the creation of the classifier. Based on a comparison between the output of the classifier model and the subjective assessment of the validation set 284, the quality of the classifier model 282 can be measured 285. This step can be repeated for different learning algorithms 281 until a best classifier is implemented 282 in the online education service 20. Once implemented, the online education service 20 can provide predictive AI assessments of student interactions as well improve the classifiers by adding to the dataset 102.

In some instances, before student interaction data (e.g., objective data) is used by the assessor system 100 to improve the classifier model 282, it must be processed to extract the metrics from the student interaction.

In some instances, the student interaction is tracked participation in a group project, and the metrics include, for example, analysis of who leads the process of breaking down each project into tasks, the assignment of tasks to other students, delegations of work etc. In some instances, the metrics measure execution time, projected and actual deadlines. In some instances the assessor system can be fed data regarding the monitoring progress and suggested behaviors, and assess whether or not students stick to suggestions to measure whether or not they are improving.

The metrics can also include if and how much a student team member is actually leading the group project in terms of helping someone who has some difficulties or to track a student's ability to reinforce and supporting someone's statements/posts in the discussion by analyzing the type of words used in the posts. Metrics can be used to trck a level of participation in the completion of a project by, for example, tracking a student's number of posts, quality of posts, or number and quality of answers received in response to the student's posts. While some metrics are specific to a group leader, some metrics track regular team members instead, such as how he/she could is performing tasks and responding to questions.

In some instances, the interaction is a student is interacting via an application (e.g., Skype) with a group of students or a an educator, and this interaction can be transformed into text and analyzed for detecting skills such as critical thinking, communication, leadership, or collaboration. In some instances, speech to text transformation can also be used and analyzed for detecting skills in the same way as any other text is analyzed for identifying different skills.

In some instances, the student interaction is a group video call and the metrics relate to facial recognition information. For example, the metrics can include an analysis of facial expressions and tone/pitch of voice in order to do, among the others, online sentiment analysis. The subject assessments can include grades of the speaker that take into account a subject assessment of the the feelings of the audience in order to correlate the skill of the speaker at affecting the audience.

Example Dataset Processing

Automatic assessment of students' written interactions, such as essays or term papers, is a challenging task, especially when the evaluation parameters are soft skills, which are intrinsically more difficult to estimate given their spreading among so called "hard skills" and their decoupling from the actual focus arguments of teachers' assignments. Aspects of the present disclosure include an assessor system that uses machine learning techniques for a chance at learning (e.g., modeling or predicting) the underlying patterns that define a good essay in terms of soft skills.

In one example, the assessor system includes a dataset processing system or is otherwise configured to receive data from a dataset processing system, where the dataset processor system is configured to conduct a series of operations on the objective data (e.g., text) of the student interactions used by the assessor system. The dataset processor can be input the raw digital data of the objective data of a student's interaction, such as the text of a student paper or a student's post on a forum, and remove from the object data any data not associated with the particular skill to be predicted by the assessor system. The dataset processor can process one objective data of a student multiple times in different ways for each particular skill to be predicted by the assessor system. In this manner, the dataset processor enables the datasets considered by the assessor system to be free of any information not related to the prediction of one or more particular skills of the student's objective data.

The follow example outlines the dataset preprocessing and processing steps for creating a dataset of from raw text written by a student, for example, in an essay. The preprocessing steps include, for example, (1) contraction removal, (2) tokenization, (3) lower casing, (4) punctuation removal, (5) number removal, and (6) Lemmatization. Contractions removal can include the removal of typical English word contraction (e.g. "can't" becomes "cannot"). Tokenization can include the process of converting text, stored as a long string of character, into a list of "tokens" (e.g. words, phrases, characters, . . . ). In the lower casing step, the tokens are all converted to lowercase, to ensure that capitalized words are interpreted the same as their non-capitalized version. This also addresses the problem of casing discrepancies. Punctuation removal includes removing any punctuation, as punctuation may carry no meaningful information in this kind of analysis. Numbers removal includes removal of Arabic numerals or symbols, which can be considered not meaningful for soft skills evaluations, and noise in the data can be removed by excluding them. Finally, lemmatization includes the process of reducing each word form to a unique lemma, which is the word's root (e.g. "running", "runner", "ran" all become "run").

In some instances, stopwords are also removed during preprocessing. Stopwords are those words, so common in a language, to be considered carrying no meaningful information about some text. In some instances, however, they are not removed, as some of them may carry useful information (e.g. frequent usage of words such as, "although" may denote a high degree of "Critical Thinking"). In the future, as more data come in and a proper evaluation of the model can be performed, it may be useful to cherry pick which stopwords to remove and which not to.

Once the objective data is preprocessed, it is encoded into a format accessible by a learning algorithm for training a classifier model such as a neural network. In this case of text objective data, this encoding can include forming the preprocessed text into a structure called Bag Of Words, which means that the preprocessed text document is transformed into a vector of numbers, each one representing the occurrences of a specific word of our vocabulary in the document.

In this section, a toy example is presented in detail. This should allow a better understanding of the pipeline which transforms the input document and outputs the corresponding evaluations.

Given the following example document:
The quick, brown fox jumps over a lazy dog. She likes jumping quickly. There's just 1 fox and it shouldn't jump over more than 2 dogs.

It goes through different cleaning steps as follows:
Contractions Substitution:
"The quick, brown fox jumps over a lazy dog. She likes jumping quickly. There is just 1 fox and it should not jump over more than 2 dogs."

Lowercasing:
"the quick, brown fox jumps over a lazy dog. she likes jumping quickly. there is just 1 fox and it should not jump over more than 2 dogs."

Punctuation Removal:
"the quick brown fox jumps over a lazy dog she likes jumping quickly there is just 1 fox and it should not jump over more than 2 dogs"

Numbers Removal:
"the quick brown fox jumps over a lazy dog she likes jumping quickly there is just fox and it should not jump over more than dogs"

Lemmatization: "the quick brown fox jump over a lazy dog she like jump quick there is just fox and it should not jump over more than dog"

Now this long sequence of words is transformed into a list of tokens, as follows:
"the" "quick" "brown" "fox" "jump" "over" "a" "lazy" "dog" "she" "like" "jump" "quick" "there" "is" "just" "fox" "and" "it" "should" "not" "jump" "over" "more" "than" "dog"

Each one of these tokens can correspond to an index in a sample vocabulary. For this example, the vocabulary contains 30 words and the tokens map is as follows:
the 0
quick 3
brown 2
fox 1
jump 5
over 15
a 4
lazy 11
dog 6
she 7
like 10
jump 5
quick 3
there 9
is 8
just 13
fox 1
and 18
it 12
should 16
not 19
jump 5
over 15
more 20
than 14
dog 6

Thus, the list of tokens can translated into a Bag of Words, which is a vector of tokens occurrence where the position in the vector corresponds to a specific token index.

In his example, the following vector is created:

1 2 1 2 1 3 2 1 1 1 1 1 1 1 1 2 1 0 1 1 1 0 0 0 0 0 0 0 0 0 where the zeros correspond to tokens in our vocabulary which do not appear in the document.

While multiple different metrics and techniques are considered, one particular example for the text objective data described above is a Term Frequency-Inverse Document Frequency metric, also referred to as a TF-IDF metric, to weigh the inputs to the model of the processed dataset. The TF-IDF metric weights a word based on the number of times it appears in the text, with respect to the length of the text itself and weights a term based on the inverse of the number of documents, in the whole corpus, which contain the said term with respect to the total number of documents in the corpus. TF-IDF is the product of these two values.

At this point, the TF-IDF measure is computed. For the scope of this explanation we can say it corresponds to dividing each number in the Bag of Words by the number of words in the document and then multiplying the result for a number specific to each index (which is that word's IDF in the training corpus).

Thus, given the example document is 26 words long, the TF-IDF calculations are performed and an input vector of the following form is obtained:

$i1$ $i2$ $i3$ $i4$ $i5$ $i6$ $i7$ $i8$ $i9$ $i10$ $i11$ $i12$ $i13$ $i14$ $i15$ $i16$ $i17$ $i18$ $i19$ $i20$ $i21$ $i22$ $i23$ $i24$ $i25$ $i26$ $i27$ $i28$ $i29$ where each position is occupied by the results of the calculation explained before.

At this point, the vector is given as input to a machine learning algorithm which, for the scope of this section, is considered as a black box that computes a certain function of the input and generates a list of one or more values as follows: [1.2, 0.6, 3.3], where each number corresponds to the evaluation in a specific soft skill.

In the end, the evaluations are formatted in a human readable from and returned to the user as follows:
Critical Thinking: 1.2
Communication: 0.6
Problem Solving: 3.3

One example classifier model suitable for applying machine learning to the present text example is a Multi-Layer Perceptron model, commonly referred to as Neural Network. In operation, the model takes the TF-IDF weighted Bag of Words as input and outputs a series of values representing the predicted scores. Technicalities on how this model learns are not discussed here, but would be understood by those of routine skill in the art.

To train a supervised learning model, a proper dataset is needed. In this case, it consists of a series of text documents accompanied by a set of evaluations, one for each of the soft skills of interest. During a training phase of the model, at first data are split into a training set (which the model will "see") and a test set (which will be used to asses model performances). Then the model is iteratively trained via a standard optimization technique for a certain number of so called "epochs". At the end of this process, the model with the best performance is retained.

In the end, the best model is exposed as a service which, when fed with a text document, returns the predicted evaluations for each soft skill. The service is also thought to be easily re-trainable as new data arrives, given the underlying structure of the model remains the same.

In some instances, the usage of new learning algorithms for model evaluation and selection is intended as an "offline" task which is performed by an expert and is not fully automated. Therefore, to eventually select a better performing architecture the system, the learning algorithms considered are updated manually. In other instances, a database of learning algorithms is implemented and different learning algorithms are tested overtime, as well as new algorithms that can be added to the database as development continues.

Example Single Skill Assessor Operation

FIG. 3 is schematic illustration showing assessor system 100 interfacing with an online education service 20. The assessor system 100 can include an input 30, a dataset processor 40, an adder 50, a compiler 60, a validator 70, a calculator 80, and an output 90. The assessor system 100 is configured to receive a dataset from the online education service 20 including objective data (E) 21 of a student interaction and an associated subjective assessment (e) 23 of the objective data 21. For example, the objective data 21 can be an essay written by the student or a forum post and the associated subject assessment 23 of that objective data 21 can be, for example, a teacher's assessment of a skill represented by the student in that objective data 21. For example, if the objective data 21 is an essay, the subjective assessment 23 can be a level of critical thinking represented by the objective data 21 as assessed by the teacher. In some instances, the subjective assessment 23 is a student's self-assessment, or, in other instances, both subjective assessments by both the student and the teacher. In some instances, the subjective assessment 23 includes separate assessments of different skills represented by the objective data. For the following FIGS. 3-11C, the subjective assessment 23 is displayed as an assessment of a single skill.

In operation, the input module 30 of the assessment system 100 receives the objective data 21 and the subjective assessment 23 and outputs a predicted assessment (e') 27 (i.e., an AI assessment) of the student's objective data 21. The assessment system 100 can calculate the predicted assessment 27 in different ways, but, in all instances, inputs the objective data 21 into a classifier, such as a neural network model, which outputs the predicted assessment 27 to the online education system 20 via the output module 90 of the assessor system 100. This operation, as well as the updating and validating of the classifier can be handled by the assessor system 100, as explained in more detail below.

Figure 4:
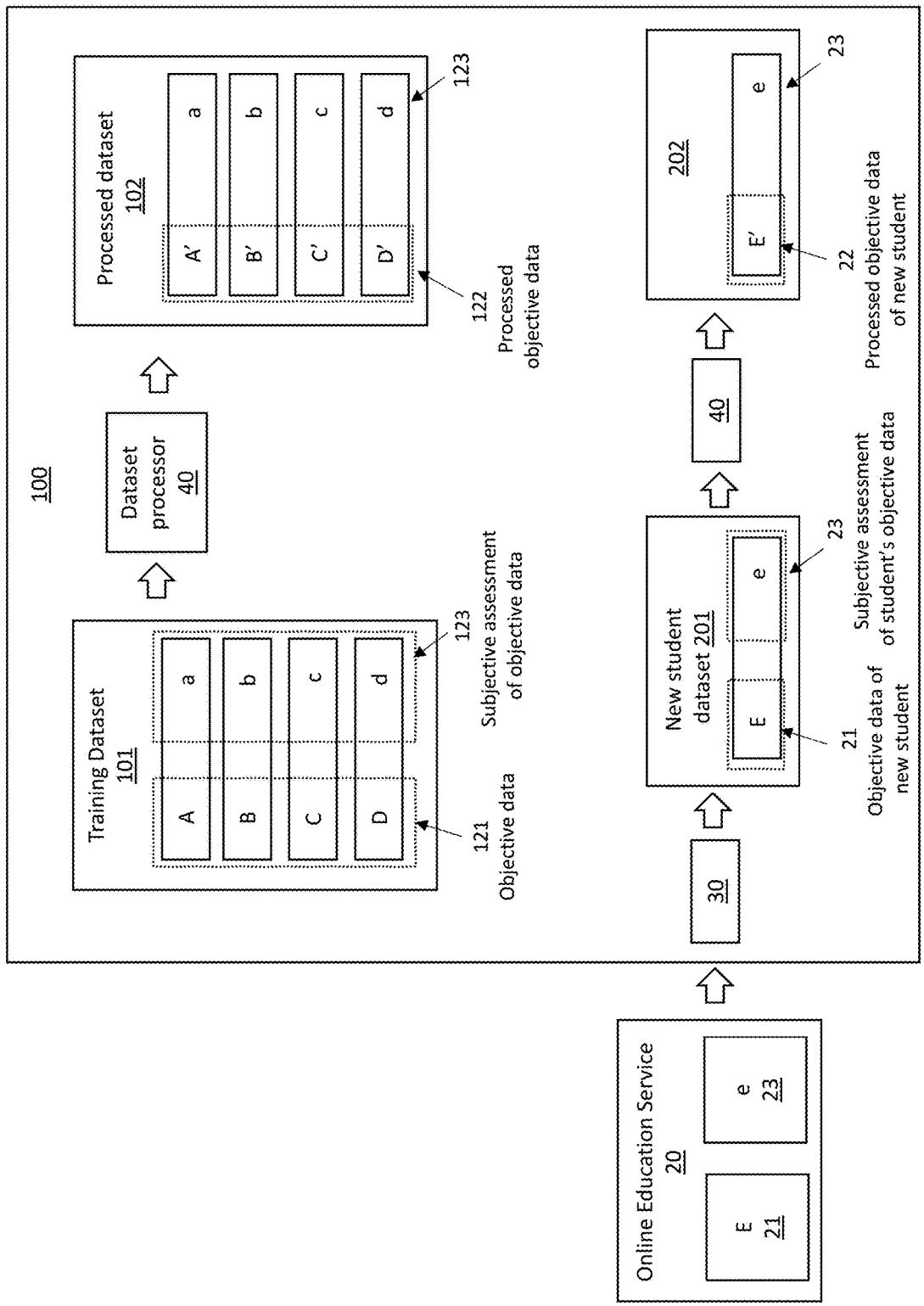
FIG. 4 is a schematic illustration showing a dataset processor operation of the assessor system.

FIG. 4 is a schematic illustration showing a dataset processor 40 operation of the assessor system 100. The dataset processor 40 is configured to take raw objective data (E) 21 and convert into processed objective data (E') 22 that is of a form suitable for training a classifier from and being input to an existing classifier for producing the predicted assessment 27. The dataset processor 40 can conduct any number of operations on the objective data 21, such as, for example, the raw text preprocessing and encoding tests provided in the example above. The dataset processor 40 can remove data from the objective data 21 that is not associated with the one or more predefined 260 metrics associated with the skill 270 of the subjective assessment 23 associated with the objective data 21.

FIG. 4 shows that the objective data 21 and subjective assessment 23 received by the input 30 forms a new dataset 201 that is input to the dataset processor 40. The dataset processor 40 outputs a processed dataset 202 which contains the processed objective data 22 and the subjective assessment 23. In some instances, the new dataset 201 includes more than one subjective assessment (e.g., grades of levels of more than one skill), and the dataset processor 40 can process the objective data 21 into one dataset 202 for each skill and move only the respective subjective assessment 23 in the respective processed dataset 202.

In some instances, and, for example, in the initial creation of the assessor system 100, the dataset processor 40 can process a training dataset 102 with objective data 121 from a plurality of students and associated subjective assessments 123 of each objective data 121. The dataset processor 40 outputs a processed dataset 102 having the processed objective data 122 of each student as well as the respective subject assessment 123.

FIG. 5 is a schematic illustration showing a dataset adder 50 operation of the assessor system 100. The dataset adder 50 is configured to add new processed datasets, such as the dataset 202 of a new student's processed objective data 22 and associated subjective assessment 23 to an existing dataset, such as the training dataset 102. The dataset adder 50 can create an updated dataset 503 which includes the processed new dataset 202 and the processed training dataset 102. The updated dataset 503 includes processed objective data 522 and associated subjective assessments 523. In some instances, the updated dataset 503 contains objective data 522 and subjective assessments 523 all for a single skill type (e.g., all of the subjective assessments are of the critical thinking skill and all of the objective data 522 was processed to have metrics associated with the same skill). In some instances, the updated dataset 503 contains objective data 522 and subjective assessments 523 all for a single interaction type (e.g., all of the processed objective data 522 is from essays). The dataset adder 50 can also create other datasets for use in operating the assessor system 100, such as a training dataset and a validation dataset.

Figure 6:
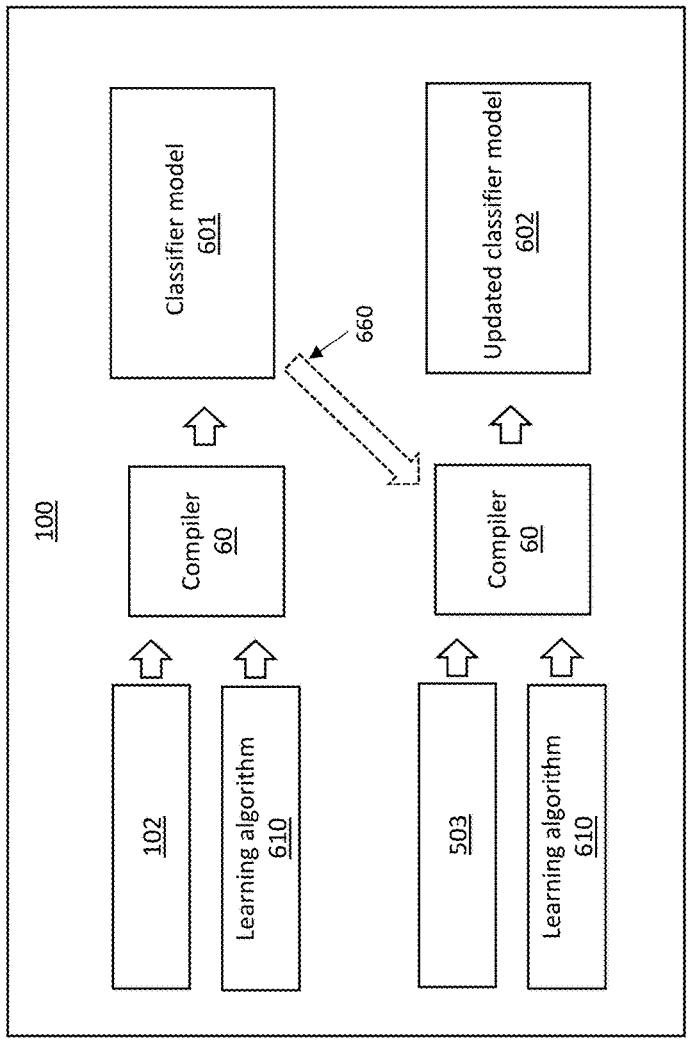
FIG. 6 is a schematic illustration showing a classifier compiling and training operation of the assessor system.

FIG. 6 is a schematic illustration showing a classifier compiling and training operation of the assessor system. The compiler 60 of the assessor system 100 is configured to take a processed dataset, such as the processed training dataset 102, and a learning algorithm 610 and compile a classifier model 601. The classifier model 601 is configured to take, as an input, processed objective data and output a predicted assessment. In some instances, the classifier model 601 is a neutral network model. In other instances, the classifier model 601 is a pattern recognition model. The compiler 60 can create the classifier model 601 by using the learning algorithm to iteratively generate a classifier that is fit to the processed training dataset 102. The techniques for this compiling operation will be understood by those of skill in the art.

In operation, when the assessor system 100 receives a new student's data and creates the processed updated dataset 503, the compiler 60 can generate a new or updated classifier 602 based on the learning algorithm to fit the processed updated dataset 503. The compiler 60 can use the old classifier model 601 as a starting point for the updated classifier model 602.

Figure 7:
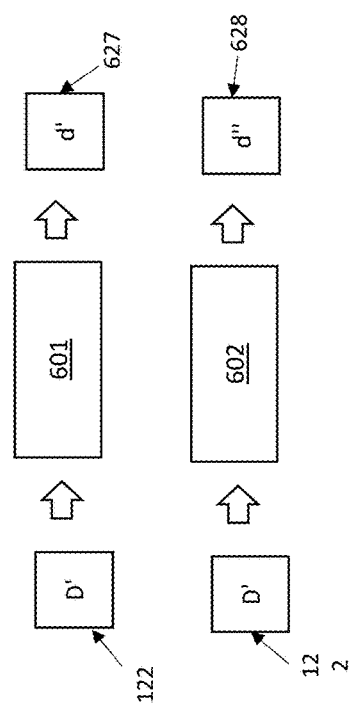
FIG. 7 is a schematic illustration showing the input and output operation of two neural network models of the assessor system.

FIG. 7 is a schematic illustration showing the input and output operation of two classifier models of the assessor system 100. FIG. 7 shows an objective data 122 (D') of the processed training dataset 102 being input to the classifier model 601 generated from the training dataset 102 and outputting a predicted assessment 627 (d') of the objective data 122. FIG. 7 also shows the objective data 122 (D') now of the processed updated dataset 503 being input to the updated classifier model 602 generated from the updated dataset 102 and outputting a different predicted assessment 628 (d") of the objective data 122. FIG. 6 illustrates that the compiling the classifier models 601, 602 using different dataset can result in different classifier models, as indicated by the different outputs from the classifiers 601, 602 given the same input.

Figure 8:
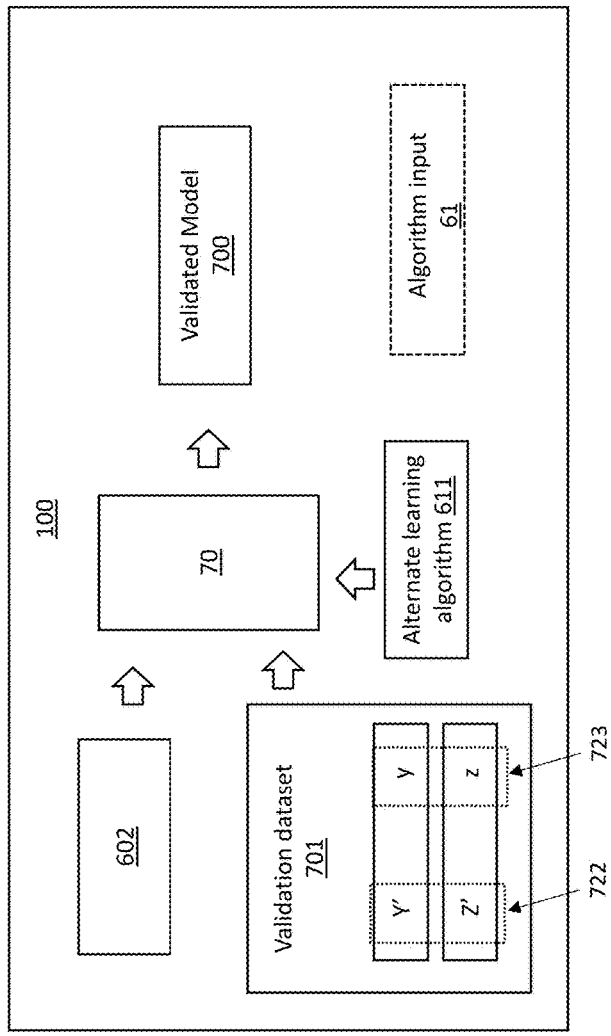
FIG. 8 is a schematic illustration showing the validator operation of the assessor system.

FIG. 8 is a schematic illustration showing the validator 70 operation of the assessor system 100. The validator 70 is configured to test a classifier 602 compiled with a first learning algorithm 610 against candidate classifiers compiled with different learning algorithms 611. The validator 70 receives a classifier, such as the updated classifier 602, as an input, along with a validation dataset 701 that was not part of the dataset that was used to compile the input classifier 602 and at least one new learning algorithm 611 that was not used to compile the input classifier 602. In some instances, the new learning algorithms 611 are input manually via an input 61. In some instances, the new learning algorithms 611 are automatically selected from a database of algorithms. Generally, the performance of any particular learning algorithm is difficult or impossible to predict in advance with respect to a particular dataset, and so new classifiers are created with each new algorithm with the same dataset in order to directly compare their performance. The validator 70 creates a candidature classifier from the same dataset for each new learning algorithm 611, tests the quality of the input classifier 602 and the candidate classifiers using the validation dataset 701, and outputs the best performing classifier as the validated classifier 700, as shown in more detail in FIG. 9. The validation dataset 701 includes processed objective data 722 and associated subject assessments 723 of the same type of interaction and skill as the dataset 503 used to create the classifier model 602. In some instances, the validation dataset 701 is removed from the updated dataset 503 before the updated dataset 503 is used to compile the classifier 602.

Figure 9:
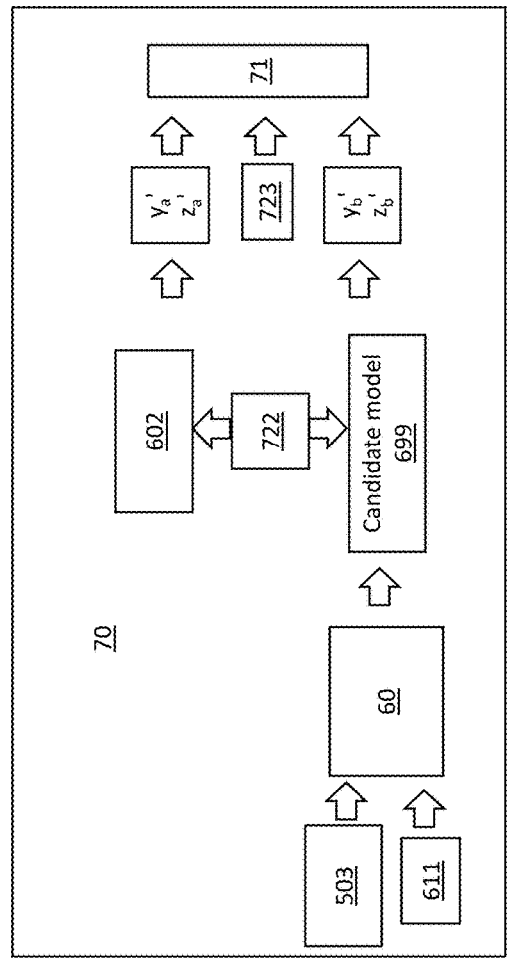
FIG. 9 is a schematic illustration showing a more detailed view of the operations of the validator of the assessor system.

FIG. 9 is a schematic illustration showing a more detailed view of the operations of the validator 70 of the assessor system 100. The validator 70 can generate a candidate classifier model 699 by running the compiler 60 with the same dataset 503 as the existing model 602, but with a new learning algorithm 511. The validator 70 then provides the objective data (Y' and Z') 722 of the validation dataset 701 to both the existing classifier 602 and the candidate classifier 699 as input. The existing classifier 602 outputs predictions $y_a'$ and $z_a'$ as outputs and the candidate classifier 699 outputs different predictions $y_b'$ $z_b'$ as outputs. The validator 70 includes a comparator 71 configured to receive the outputs from the classifiers 602, 699, as well as the actual subjective assessments (y, z) 723 of the validation dataset 701 and measure the quality of the predictions $y_a'$ $z_a'$ $y_b'$ $z_b'$ against the subjective assessments 723 of the validation dataset 701 (e.g., the ground truth of the objective data inputs 722). Based on the measures of quality of each classifier 602, 699, the validator selects the better classifier as the validated model 700. In some instances, the comparator 71 uses a receiver operator curve function to measure the quality of each output.

Figure 10A:
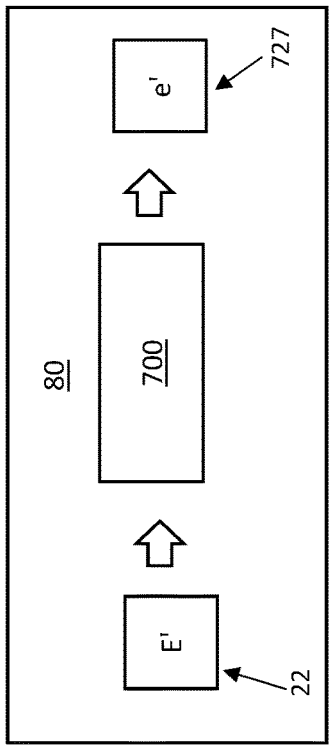
FIGS. 10A-C are schematic illustrations showing the calculation operation of the assessor system.
Figure 10B:
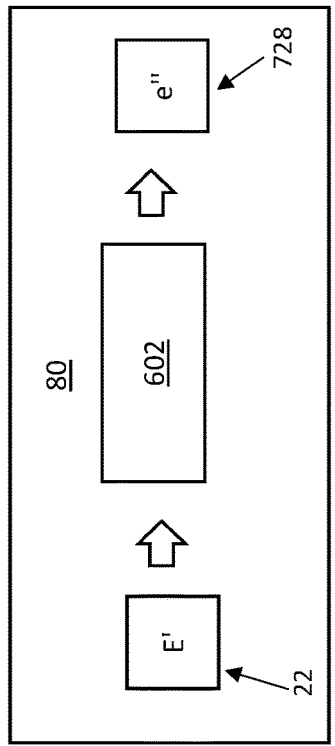
Figure 10C:
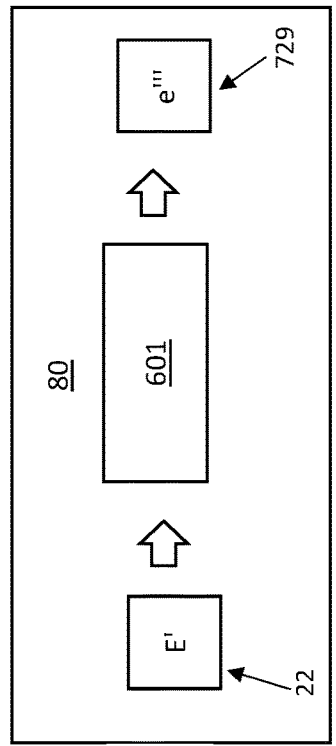

FIGS. 10A-C are schematic illustrations showing the calculation operation of the assessor system, showing that the initial classifier 601, the updated classifier 602 (e.g., a classifier recompiled using new data), and the validated classifier 700 (e.g., a classifier chosen from a plurality of classifiers compiled with different learning algorithms), can all provide a different predicted assessment of the input processed objective data 22. However, depending on the computational effort needed to either compiled the updated classifier 602 or compile and test even more classifiers to resolve a validated classifiers 700, the assessor system 100 can operate in different modes to implement different responses to each new dataset received via the input 30, as show in FIGS. 11A-C.

FIGS. 11A-C are schematic illustrations showing the overall operation of the assessor system in different operative modes. FIG. 11A shows the assessor system 100 receiving the new student data 21, 23 and subsequently processing the data (block 40), adding the new data to the existing dataset (block 50), compiling a new classifier model (block 60), validating that classifier model (bock 70) and using the validated classifier model 700 as the model executed by the calculator 80 to generate a predicted assessment 27. FIG. 11B shows the assessor system 100 compiling an updated classifier 602 with the new data, but not conducting a validation step. In this instance, the calculator 80 uses the updated classifier model 602 to generate a predicted assessment 28. This mode can be used, for example, when the previous validation showed the current learning algorithm to be performing very well, or when the validator 70 is set to run only once a given threshold of new data has been added to the updated dataset 503. Finally, FIG. 11C shows the assessor system processing the new data (block 40), but using the existing classifier 601 in the calculator 80 to generate the predicted assessment 29. This case is the least computationally intensive, as compiling a new classifier model (either 602, or 602 and how every many candidate classifiers are created by the validator 70) is a much more computationally intensive task than executing an existing classifier model 601 on one or more new objective data 21. In some instances, the assessor 100 runs a separate operation 199 that can, for example, update the dataset and recompile and revalidate the classifier once a given number of new datasets are received. Or, in other instances, be constantly updating and revalidating the classifiers, but only implement a newly validated classifier in the calculator 80 once a given condition is met, such as a target quality score, or new algorithms become available for consideration.

Example Multi Skill Assessor Operation

Figure 12:
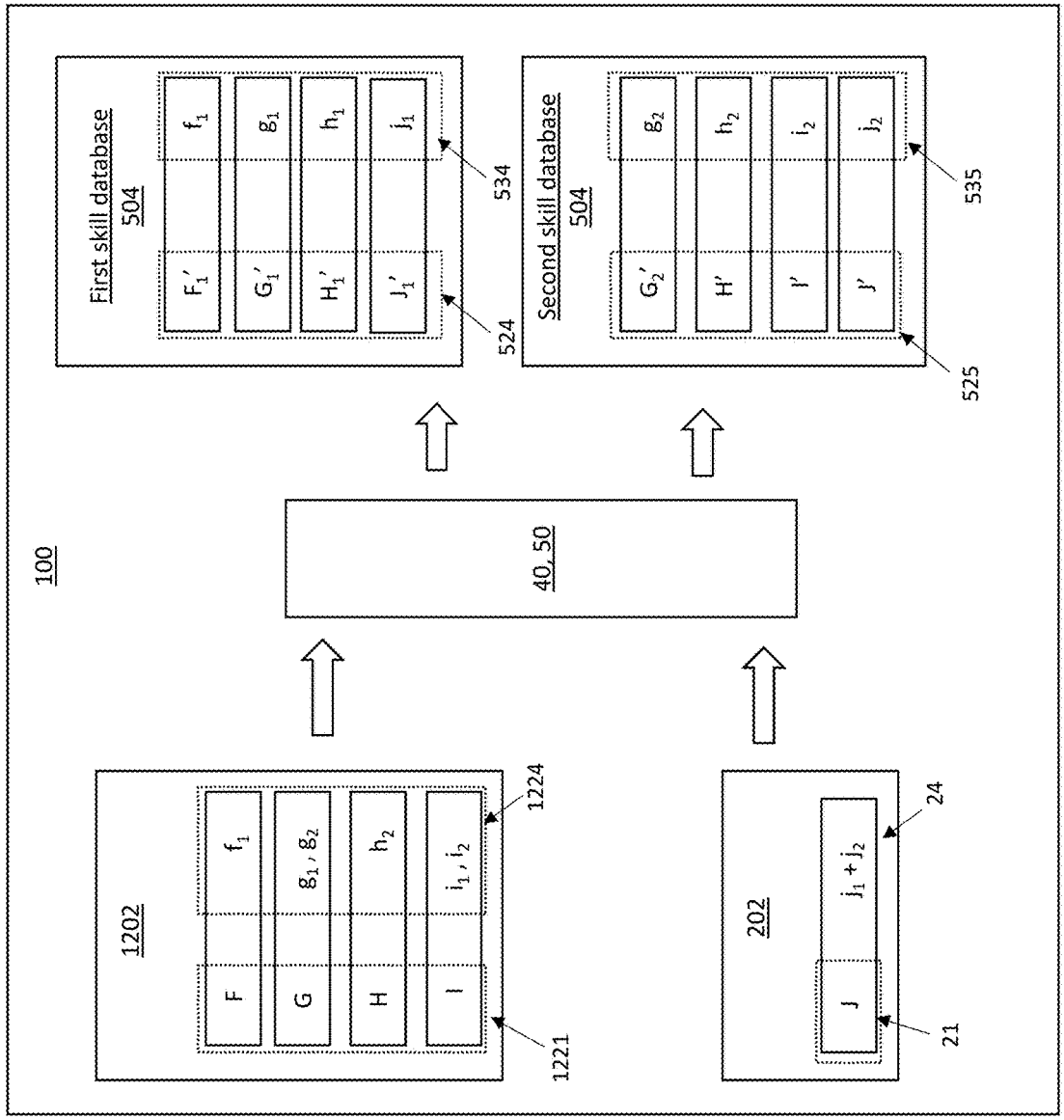
FIG. 12 is a schematic illustration showing the dataset processing an assessing operation of a dataset including multiple different skill level assessments.

FIG. 12 is a schematic illustration showing the dataset processing an assessing operation of a dataset including multiple different skill level assessments. In FIG. 12, the assessor system 100 receives as an input a new dataset 202 that includes objective data 21 and subjective assessments 24 of two different skills ($j_1$, $j_2$). Accordingly, an initial dataset 1202 may also include objective data 1221 having a subject assessment 1224 of either one or both of the skills of the new dataset 202. In operation, the dataset processor 40 separates the initial dataset 1202 and any new dataset 202 by skill, creating a first skill dataset and a second skill dataset, because, for example the processing of the objective data 21, 1221 can depends on different metrics for each skill. Afterwards, the adder 50 adds the objective data ($J_1'$, $J_2'$) of processed new dataset to the respective first skill dataset 504 and second skill dataset 505, along with the respective subjective assessment for that skill ($j_1$ or $j_2$). The same operation previously took place with the existing dataset 1202, such that the processed objective data of the first skill 524 is in the first skill dataset 504 along with the associated subjective assessments 534 of each processed objective data 524. Similarly, the differently processed objective data of the second skill 525 is in the second skill dataset 505 along with the associated subjective assessments 535 of each processed objective data 525.

Figure 13:
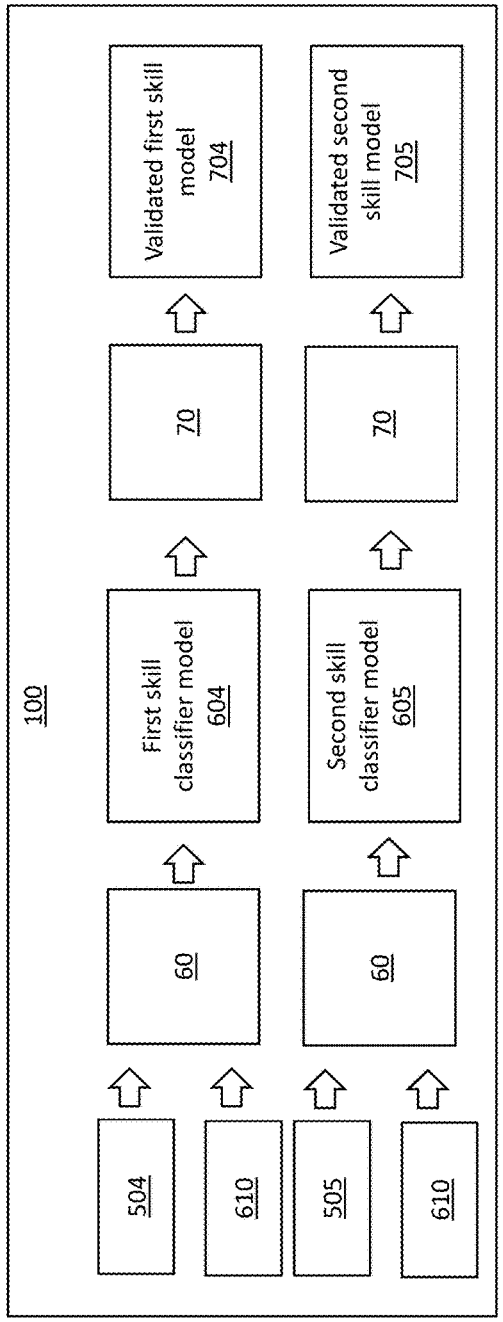
FIG. 13 is a schematic illustration showing the compiling and validation operations where one classifiers is used for each of the skill level assessments present in the objective data.

FIG. 13 is a schematic illustration showing the compiling and validation operations where one classifiers is used for each of the skill level assessments present in the objective data. FIG. 13 shows that the assessor system 100 creates a separate classifier 604, 605 for each skill dataset 504, 504, and can also separately validate each classifier model 604, 605 for the different skills, using a validation dataset associated with each skill (e.g., processed objective data and respective subjective assessments of one skill that were removed from the dataset 504, 504 prior to compiling the classifier).

Figure 14:
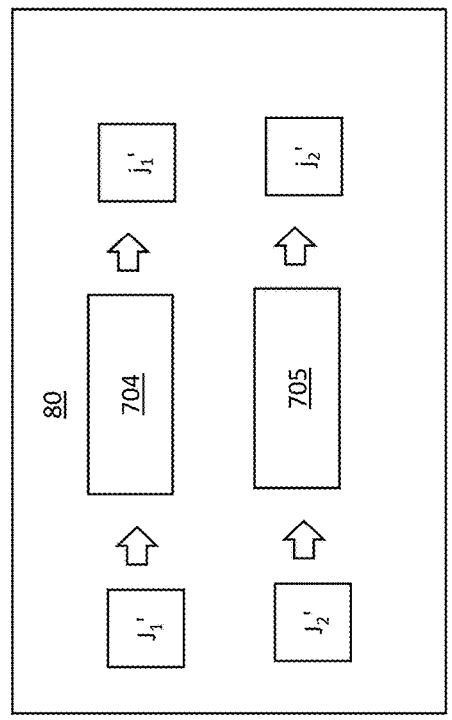
FIG. 14 is a schematic illustration showing the calculation operation of the assessor system for generating a prediction of two skill levels.

FIG. 14 is a schematic illustration showing the calculation operation of the assessor system for generating a prediction of two skill levels. FIG. 14 shows that each skill classifier 704, 705 (or 604, 605, if no validation step is conducted), expects, as an input objective data ($J_1'$ $J_2'$) that has been processed different (e.g., in the same manner as the objective data used to compile the respective classifier 704, 705). The first skill classifier 704 outputs a predicted assessment ($j_1'$) of the first skill of the objective data ($J_1'$) processed according to the metrics of the first skill, and the second skill classifier 705 outputs a predicted assessment ($j_2'$) of the second skill of the objective data ($J_2'$) processed according to the metrics of the second skill. In this manner, the assessor system 100 can (1) separately maintain distinct classifiers and datasets for each skill, (2) process new datasets depending on the skills of the subjective assessments therein, and (3) update and execute different classifiers according to the skills of the subjective assessments received in the new datasets.

Figure 15:
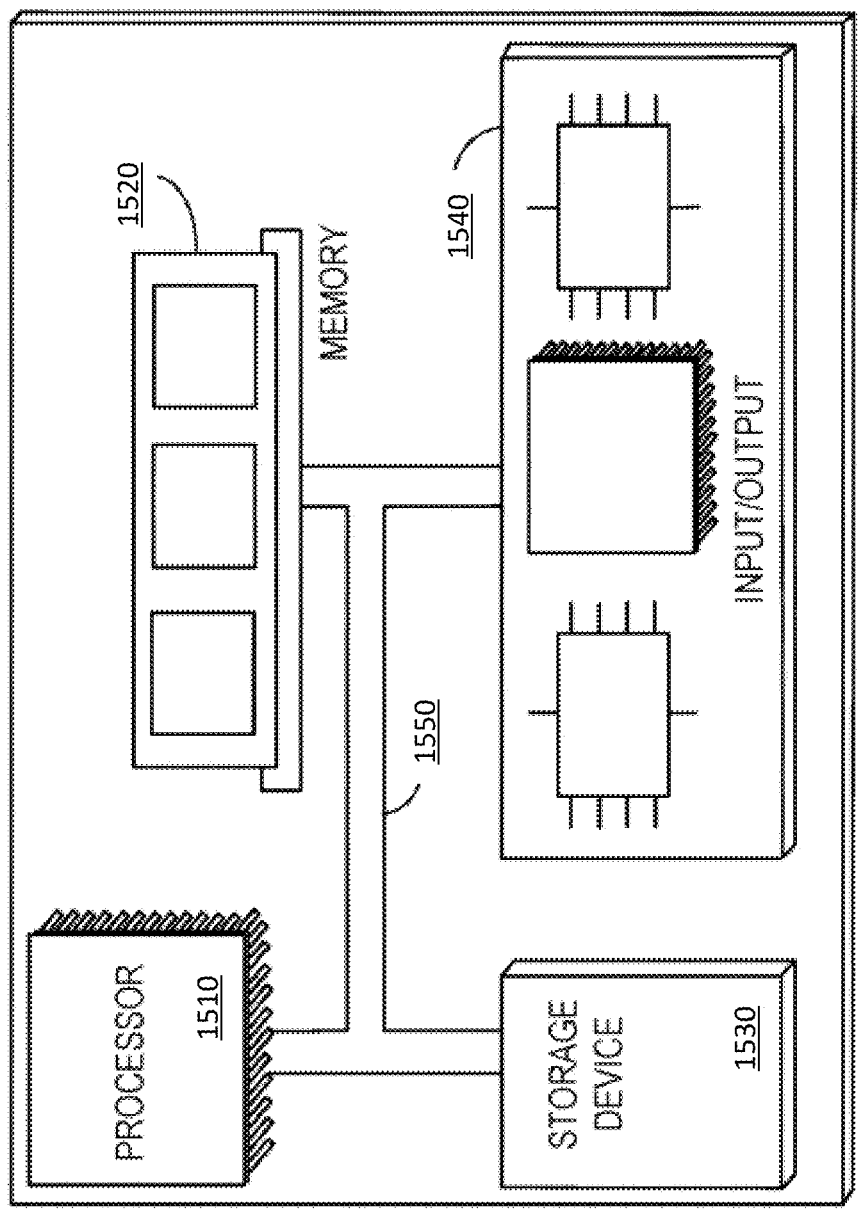
FIG. 15 is a block diagram of an example computer system.

FIG. 15 is a block diagram of an example computer system 500. For example, referring to FIGS. 1-14, the processing modules 30, 40, 50, 60, 70, 80, 90, and 100 could be examples of the system 1500 described here. The system 1500 includes a processor 1510, a memory 1520, a storage device 1530, and an input/output device 1540. Each of the components 1510, 1520, 5130, and 1540 can be interconnected, for example, using a system bus 1550. The processor 510 is capable of processing instructions for execution within the system 1500. The processor 1510 can be a single-threaded processor, a multi-threaded processor, or similar device. The processor 1510 is capable of processing instructions stored in the memory 1520 or on the storage device 1530. The processor 510 may execute operations such as causing the dialysis system to carry out functions related to a dialysis treatment according to a prescription received in a digital prescription file.

The memory 520 stores information within the system 1500. In some implementations, the memory 520 is a computer-readable medium. The memory 1520 can, for example, be a volatile memory unit or a non-volatile memory unit. In some implementations, the memory 1520 stores information related to patients' identities.

The storage device 1530 is capable of providing mass storage for the system 1500. In some implementations, the storage device 530 is a non-transitory computer-readable medium. The storage device 1530 can include, for example, a hard disk device, an optical disk device, a solid-date drive, a flash drive, magnetic tape, or some other large capacity storage device. The storage device 1530 may alternatively be a cloud storage device, e.g., a logical storage device including multiple physical storage devices distributed on a network and accessed using a network. In some implementations, the information stored on the memory 520 can also or instead be stored on the storage device 1530.

The input/output device 1540 provides input/output operations for the system 1500. In some implementations, the input/output device 1540 includes one or more of network interface devices (e.g., an Ethernet card), a serial communication device (e.g., an RS-232 10 port), and/or a wireless interface device (e.g., a short-range wireless communication device, an 802.11 card, a 3G wireless modem, or a 4G wireless modem). In some implementations, the input/output device 1540 includes driver devices configured to receive input data and send output data to other input/output devices, e.g., a keyboard, a printer, and display devices (such as the GUI 12). In some implementations, mobile computing devices, mobile communication devices, and other devices are used.

In some implementations, the system 1500 is a microcontroller. A microcontroller is a device that contains multiple elements of a computer system in a single electronics package. For example, the single electronics package could contain the processor 1510, the memory 1520, the storage device 1530, and input/output devices 540.

Although an example processing system has been described above, implementations of the subject matter and the functional operations described above can be implemented in other types of digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible program carrier, for example a computer-readable medium, for execution by, or to control the operation of, a processing system. The computer readable medium can be a machine readable storage device, a machine readable storage substrate, a memory device, a composition of matter effecting a machine readable propagated signal, or a combination of one or more of them.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as a pre-configured, stand-along hardware element and/or as preprogrammed hardware elements (e.g., application specific integrated circuits, FPGAs, and digital signal processors), or other related components.

The term "computer system" may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Such implementation may include a series of computer instructions fixed either on a tangible, non-transitory medium, such as a computer readable medium. The series of computer instructions can embody all or part of the functionality previously described herein with respect to the system. Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM and DVD-ROM disks. The processor and the memory can be supplemented by, or incorporated in, special purpose logic circuitry. The components of the system can be interconnected by any form or medium of digital data communication, e.g., a communication network. Examples of communication networks include a local area network ("LAN") and a wide area network ("WAN"), e.g., the Internet.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. One skilled in the art will appreciate further features and advantages of the disclosure based on the above-described embodiments. Such variations and modifications are intended to be within the scope of the present invention as defined by any of the appended claims. Accordingly, the disclosure is not to be limited by what has been particularly shown and described, except as indicated by the appended claims. All publications and references cited herein are expressly incorporated herein by reference in their entirety.

What is claimed is:

1. A computer-implemented system for assessing student skills using machine learning, comprising:
an input configured to receive an initial dataset comprising a plurality of objective data of student interactions of a same type, and for each of the plurality of objective data, at least one subjective assessment of a skill of a student represented in the respective objective data of that student, and a new dataset comprising objective data of a first student of an interaction of the same type as the initial dataset, and an associated subjective assessment of the skill represented by the new objective data;
a dataset processor configured to remove extra segments from the initial dataset and the new dataset, the extra segments being a subset of the objective data not associated with the subjective assessment of the skill;
an adder configured to combine the processed initial dataset and the processed new dataset to form a model dataset;
a compiler configured to:
create and train a classifier model to fit the processed initial dataset using a learning algorithm, the classifier model receiving processed objective data as an input and calculating a predicted assessment of the skill of the objective data as an output, and
retrain the classifier model using the model dataset with a learning algorithm using; and
a calculator configured to generate a predicted assessment of the skill of the objective data of the first student by inputting the processed new objective data of the first student into the classifier before or after the classifier model has been recompiled.

2. The system of claim 1, wherein the classifier model is a neural network model.

3. A method of assessing student skills using machine learning, comprising:
receiving, with a computer system, an initial dataset comprising:
a plurality of objective data of student interactions of a same type, and
for each of the plurality of objective data, at least one subjective assessment of a skill of a student represented in the respective objective data of that student;
processing, with a computer system, the initial dataset to remove extra segments, the extra segments being a subset of the objective data not associated with the at least one subjective assessment of the skill;
compiling, with a computer system, an classifier model with a learning algorithm to fit the processed initial dataset, the classifier model receiving processed objective data as an input and calculating a predicted assessment of the skill of the objective data as an output;
receiving, with a computer system, a new dataset comprising objective data of a student interaction of a first student of the same type as the initial dataset and an associated subjective assessment of the skill of the first student represented by the new objective data;
processing, with a computer system, the new dataset to remove extra segments;
combining, with a computer system, the processed initial dataset and the processed new dataset to form a model dataset;
recompiling, with a computer system, the classifier model to fit the model dataset based on a learning algorithm; and
calculating, with a computer system, a predicted assessment of the skill of the objective data of the first student by inputting the processed objective data of the first student into the classifier model before or after being recompiled to fit the model dataset.

4. The method of claim 3, wherein the classifier model is a neural network model.

5. The method of claim 4, wherein compiling the neural network model to fit the processed initial dataset includes compiling a plurality of candidate models each based on different learning algorithms, and the compiling includes:
  measuring a quality of each the plurality candidate models with respect to a validation dataset; and
  implementing one of the plurality of candidate models as the neural network model based on the measured quality.

6. The method of claim 5, wherein the quality is an objective measure of how well each of the plurality of candidate models recreates subjective assessments of a dataset when objective data of the dataset is provided as an input to each of the plurality of candidate models.

7. The method of claim 4, wherein the learning algorithm is a plurality of learning algorithms and recompiling neural network model to fit the model data comprises compiling a plurality of candidate models each based on different learning algorithms, the method comprising:
  measuring a quality of each the plurality candidate models with respect to a validation dataset; and
  implementing one of the plurality of candidate models as the recompiled neural network model based on the measured quality.

8. The method of claim 7, wherein the quality is an objective measure of how well each of the plurality of candidate models recreates subjective assessments of a dataset when objective data of the dataset is provided as an input to each of the plurality of candidate models.

9. The method of claim 3, wherein the initial dataset comprises, for one or more of the plurality of objective data, subjective assessments of two or more skills of the student represented in the respective objective data of that student, and wherein the classifier model is compiled to fit one skill of the two or more skills of the initial dataset, the one skill being the same as the received associated subjective assessment of the first dataset.

10. The method of claim 9, wherein the new dataset comprises an associated subjective assessment of two or more skills of the first student, the two or more skills of the new dataset being also in the two or more skills of the initial dataset, the method comprising compiling a classifier model to fit each of the two or more skills of the processed initial dataset and calculating a predicted assessment of the two or more skills of the objective data of the first student by inputting the processed objective data of the first student into the respective classifier model.

11. The method of claim 3, wherein receiving the new dataset comprises receiving the new dataset via an online learning service.

12. The method of claim 11, comprising, providing the predicted assessment to the online learning service.

13. The method of claim 3, wherein each of the objective data of the initial dataset comprises text written by a respective student, wherein the objective data of the new dataset comprises text written by the first student, and wherein processing the initial dataset and the new dataset to remove extra segments from the respective objective data comprises converting the text of the objective data into a Bag of Words structure.

14. The method of claim 3, wherein the at least one subjective assessment of the initial dataset comprises a respective student self-assessment and teacher assessment, and wherein the output of the classifier model comprises a predicted self-assessment of the skill and a predicted teacher assessment of the skill for each objective data input.

15. The method of claim 14, wherein the associated subject assessment includes a student self-assessment.

16. The method of claim 3, comprising:
  soliciting a self-assessment from the student associated with the new dataset; and
  providing the predicted assessment of the skill of the objective data of the first student upon receiving the self-assessment.

17. The method of claim 3, wherein the skill is one of the following: critical thinking, problem solving, multiculturalism, communication, plain English, collaboration, leadership, collaboration, and organization.

18. The method of claim 3, wherein the student interaction is a written response to the writing prompt, and the objective data the text of the written response.

19. The method of claim 3, wherein the student interaction is group project, and the objective data includes tracked activity of student members completing the group project.

20. The method of claim 3, wherein the student interaction is a group video conference, and the objective data includes facial expressions of the student members participating in the group video conference.

21. The method of claim 3, wherein the student interaction is an internet forum, and the objective data includes written posts to the internet forum.

22. The method of claim 3, wherein the associated subjective assessment and the predicted assessment include a thematic assessment.

23. A method of assessing student skills using machine learning, comprising:
  receiving, with a computer system, a first dataset comprising objective data of a student interaction of a first student and an associated subjective assessment of a skill of the first student represented by the objective data of the first dataset;
  processing, with a computer system, the first dataset to remove extra segments, the extra segments being a subset of the objective data not associated with the subjective assessment of the skill;
  receiving, with a computer system, a second dataset comprising objective data of a second student of a same type of student interaction and an associated subjective assessment of the skill of the second student represented by the objective data of the second student;
  processing, with a computer system, the second dataset to remove extra segments;
  combining, with a computer system, the processed first and second datasets to form a model dataset;
  compiling, with a computer system, a classifier model to fit the model dataset based on a learning algorithm, the classifier model receiving processed objective data as an input and calculating a predicted assessment of the skill of the processed objective data as an output;
  calculating, with a computer system, an predicted assessment of the skill of the objective data of at least one of the first student and the second student by inputting the processed objective data of the respective student into the classifier model.

24. The method of claim 23, wherein receiving the first and second datasets comprises receiving the first and second datasets via an online learning service.

25. The method of claim 24, comprising, providing the predicted assessment to the online learning service.

26. The method of claim 23, wherein the classifier model is a neural network model.

27. The method of claim 26, comprising:
  calculating, with a computer system, an assessment of the skill of the objective data of the second student by inputting the processed second objective data of the second student into the neural network.

28. The method of claim 26, wherein compiling the classifier model model to fit the model dataset includes compiling a plurality of candidate models each based on different learning algorithms, and the compiling includes:
- measuring a quality of each the plurality candidate models with respect to at least one of: the model dataset and a validation dataset; and
- implementing one of the plurality of candidate models as the neural network model based on the measured quality.

29. The method of claim 28, wherein measuring the quality of each of the plurality of candidate models comprises calculating a receiver operating character curve.

30. The method of claim 28, wherein the quality is an objective measure of how well each of the plurality of candidate models recreates subjective assessments of a dataset when objective data of the dataset is provided as an input to each of the plurality of candidate models.

31. A computer program product for use on a computer system for assessing student skills using machine learning the computer program product comprising a tangible, non-transient computer usable medium having computer readable program code thereon, the computer readable program code comprising:
- program code configured to:
  - receive an initial dataset comprising a plurality of objective data of a type of student interaction and, for each of the plurality of objective data, at least one subjective assessment of a skill of a student represented in the respective objective data of that student;
  - process the initial dataset to remove extra segments, the extra segments being a subset of the objective data not associated with the subjective assessment of the skill;
  - compile a classifier model to fit the processed initial dataset, the classifier model receiving processed data as an input and calculating an assessment of the skill of the processed data as an output;
  - receive a new dataset comprising objective data of a first student in response to stimuli of the same type as the initial dataset and an associated subjective assessment of the skill in new objective data;
  - process the new dataset to remove extra segments;
  - combine the processed initial dataset and the processed new dataset to form a model dataset;
  - recompile the classifier model to fit the model dataset using a learning algorithm; and
  - calculate an assessment of the skill of the objective data of the first student by inputting the processed objective data of the first student into the neural network before or after being recompiled to fit the model dataset.

* * * * *